(12) United States Patent
Swier et al.

(10) Patent No.: US 11,193,051 B2
(45) Date of Patent: Dec. 7, 2021

(54) HOT MELT ADHESIVE COMPOSITION CONTAINING A POLYOLEFIN-POLYDIORGANOSILOXANE COPOLYMER AND METHODS FOR THE PREPARATION AND USE THEREOF

(71) Applicants: Dow Silicones Corporation, Midland, MI (US); Dow Global Technologies LLC, Midland, MI (US)

(72) Inventors: Steven Swier, Midland, MI (US); Glenn Gordon, Midland, MI (US); Zachary Kean, Bay City, MI (US); Michael Behr, Midland, MI (US); John Bernard Horstman, Midland, MI (US)

(73) Assignees: DOW SILICONES CORPORATION, Midland, MI (US); DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 16/969,856

(22) PCT Filed: Feb. 22, 2019

(86) PCT No.: PCT/US2019/019078
§ 371 (c)(1),
(2) Date: Aug. 13, 2020

(87) PCT Pub. No.: WO2019/182718
PCT Pub. Date: Sep. 26, 2019

(65) Prior Publication Data
US 2021/0009880 A1    Jan. 14, 2021

Related U.S. Application Data

(60) Provisional application No. 62/644,852, filed on Mar. 19, 2018, provisional application No. 62/644,826, filed on Mar. 19, 2018.

(51) Int. Cl.
| | |
|---|---|
| *C09J 183/10* | (2006.01) |
| *C08F 8/22* | (2006.01) |
| *C08F 8/42* | (2006.01) |
| *C08G 77/12* | (2006.01) |
| *C08G 77/442* | (2006.01) |
| *C09J 183/14* | (2006.01) |

(52) U.S. Cl.
CPC .............. *C09J 183/10* (2013.01); *C08F 8/22* (2013.01); *C08F 8/42* (2013.01); *C08G 77/12* (2013.01); *C08G 77/442* (2013.01); *C09J 183/14* (2013.01); *C08F 2410/01* (2013.01)

(58) Field of Classification Search
CPC .............. C09J 183/10; C08G 77/442
See application file for complete search history.

(56) References Cited

U.S. PATENT DOCUMENTS

| | | |
|---|---|---|
| 2,676,182 A | 4/1954 | Daudt et al. |
| 3,159,601 A | 12/1964 | Ashby |
| 3,175,993 A | 3/1965 | Weyenberg |
| 3,220,972 A | 11/1965 | Lamoreaux |
| 3,296,291 A | 1/1967 | Chalk et al. |
| 3,419,593 A | 12/1968 | Willing |
| 3,516,946 A | 6/1970 | Modic |
| 3,660,443 A | 5/1972 | Boissieras et al. |
| 3,663,649 A | 5/1972 | Wheeler, Jr. |
| 3,691,257 A | 9/1972 | Kendrick et al. |
| 3,814,730 A | 6/1974 | Karstedt |
| 3,989,668 A | 11/1976 | Lee et al. |
| 4,370,358 A | 1/1983 | Hayes et al. |
| 4,584,355 A | 4/1986 | Blizzard et al. |
| 4,585,836 A | 4/1986 | Homan et al. |
| 4,591,622 A | 5/1986 | Blizzard et al. |
| 4,611,042 A | 9/1986 | Rivers-Farrell et al. |
| 4,707,531 A | 11/1987 | Shirahata |
| 4,766,176 A | 8/1988 | Lee et al. |
| 4,774,310 A | 9/1988 | Butler |
| 4,784,879 A | 11/1988 | Lee et al. |
| 4,962,076 A | 10/1990 | Chu et al. |
| 5,017,654 A | 5/1991 | Togashi et al. |
| 5,036,117 A | 7/1991 | Chung et al. |
| 5,051,455 A | 9/1991 | Chu et al. |
| 5,053,442 A | 10/1991 | Chu et al. |
| 5,175,325 A | 12/1992 | Brown et al. |
| 5,310,843 A | 5/1994 | Morita |
| 5,744,541 A | 4/1998 | Sawaguchi et al. |
| 5,854,356 A | 12/1998 | Bergstrom et al. |

(Continued)

FOREIGN PATENT DOCUMENTS

| | | |
|---|---|---|
| EP | 0347895 | 12/1989 |
| EP | 1907495 | 4/2008 |

(Continued)

OTHER PUBLICATIONS

Ayandele, et al.; Polyhedral Oligomeric Silsesquioxane (POSS)-Containing Polymer Nanocomposites; Nanomaterials 2012; 2: 445.
Bulsari et al., Hydrosilylation of impact polypropylene co-polymer in a twin-screw extruder. Journal of Elastomers & Plastics vol. 40 Issue 4 pp. 365-380, 2008.
Ciolino, A. E., et al. (2004). "Synthesis of polybutadiene-graft-poly(dimethylsiloxane) and polyethylene-graft-poly (dimethylsiloxane) copolymers with hydrosilylation reactions." Journal of Polymer Science Part A: Polymer Chemistry 42(12): 2920-2930.
"Graiver., ""Graft and block copolymers with polysiloxane and vinyl polymersegments."" Silicon Chemistry 2002, p. 107-120, vol. 1, No. 2. Norwell, Maine."
Inoue, et al. Reactions of Organozinc Coordination Compounds. Journal of Organometallic Chemistry, p. 11-16.

(Continued)

*Primary Examiner* — Marc S Zimmer
(74) *Attorney, Agent, or Firm* — Warner Norcross + Judd LLP

(57) ABSTRACT

A hot melt adhesive composition includes a polyolefin-polydiorganosiloxane block copolymer, a polydiorganosiloxane, and a polyorganosilicate resin. The hot melt adhesive composition is useful in electronic device assembly processes.

16 Claims, No Drawings

(56) References Cited

U.S. PATENT DOCUMENTS

| | | | |
|---|---|---|---|
| 5,905,123 A * | 5/1999 | Cifuentes | C09J 183/04 525/477 |
| 5,910,547 A | 6/1999 | Schwindeman et al. | |
| 6,084,030 A | 7/2000 | Janssen et al. | |
| 6,127,502 A | 10/2000 | Krahnke et al. | |
| 6,175,031 B1 | 1/2001 | Tachikawa | |
| 6,258,891 B1 * | 7/2001 | Hoxmeier | C08G 77/442 524/848 |
| 6,265,518 B1 | 7/2001 | Krahnke et al. | |
| 6,624,254 B1 | 9/2003 | Arriola et al. | |
| 6,753,438 B2 | 6/2004 | Taylor et al. | |
| 7,064,173 B2 | 6/2006 | Rubinsztajn et al. | |
| 7,087,686 B2 | 8/2006 | Britovsek et al. | |
| 7,148,370 B1 | 12/2006 | Rubinsztajn et al. | |
| 7,355,089 B2 | 4/2008 | Chang et al. | |
| 7,858,706 B2 | 12/2010 | Arriola et al. | |
| 8,017,693 B2 | 9/2011 | Makio et al. | |
| 8,053,529 B2 | 11/2011 | Carnahan et al. | |
| 8,058,373 B2 | 11/2011 | Stevens et al. | |
| 8,088,869 B2 | 1/2012 | Joseph et al. | |
| 8,426,519 B2 | 4/2013 | Cogen et al. | |
| 8,476,375 B2 | 7/2013 | Backer et al. | |
| 8,501,885 B2 | 8/2013 | Arriola | |
| 8,501,894 B2 | 8/2013 | Crowther et al. | |
| 8,569,417 B2 | 10/2013 | Backer et al. | |
| 8,580,073 B2 * | 11/2013 | Behl | C08L 83/00 156/325 |
| 8,785,554 B2 | 7/2014 | Li Pi Shan et al. | |
| 8,835,548 B2 | 9/2014 | Esseghir et al. | |
| 8,859,709 B2 | 10/2014 | Katsoulis et al. | |
| 9,181,379 B2 | 11/2015 | Backer et al. | |
| 9,237,865 B2 | 1/2016 | Wang et al. | |
| 9,273,163 B2 | 3/2016 | Crowther et al. | |
| 9,388,265 B2 | 7/2016 | Burns et al. | |
| 9,441,079 B2 | 9/2016 | Yang et al. | |
| 9,493,615 B2 | 11/2016 | Backer et al. | |
| 9,862,867 B2 | 1/2018 | Gordon et al. | |
| 10,307,052 B2 | 6/2019 | Fujimori | |
| 2006/0155090 A1 | 7/2006 | Ferenz | |
| 2006/0199930 A1 | 9/2006 | Li Pi Shan et al. | |
| 2007/0167578 A1 | 7/2007 | Arriola et al. | |
| 2008/0300358 A1 | 12/2008 | Cook | |
| 2008/0311812 A1 | 12/2008 | Arriola et al. | |
| 2009/0042043 A1 | 2/2009 | Joseph et al. | |
| 2009/0156776 A1 | 6/2009 | Chojnowski | |
| 2010/0181092 A1 | 7/2010 | Cree et al. | |
| 2010/0029705 A1 | 8/2010 | Lin et al. | |
| 2011/0172367 A1 | 7/2011 | Backer et al. | |
| 2012/0178867 A1 | 7/2012 | Esseghir et al. | |
| 2012/0283388 A1 | 11/2012 | Backer et al. | |
| 2014/0161858 A1 | 6/2014 | Mays et al. | |
| 2015/0247007 A1 * | 9/2015 | Yang | C08G 81/024 525/106 |
| 2015/0376482 A1 | 12/2015 | Bekemeier et al. | |
| 2016/0200909 A1 | 7/2016 | Chang et al. | |
| 2016/0376482 A1 | 12/2016 | Morgeneyer et al. | |
| 2017/0133121 A1 | 5/2017 | Yu et al. | |
| 2020/0140618 A1 | 5/2020 | Gohndrone et al. | |
| 2020/0157286 A1 | 5/2020 | Swier et al. | |
| 2020/0231755 A1 | 7/2020 | Gohndrone et al. | |
| 2020/0231756 A1 | 7/2020 | Gohndrone et al. | |
| 2020/0407512 A1 * | 12/2020 | Swier | C08G 77/442 |

FOREIGN PATENT DOCUMENTS

| | | |
|---|---|---|
| JP | 03015444 | 3/2000 |
| WO | 9747665 | 12/1997 |
| WO | 9833842 | 8/1998 |
| WO | 20020081551 | 10/2002 |
| WO | 2003093349 | 11/2003 |
| WO | 2003093369 | 11/2003 |
| WO | 2004037941 | 5/2004 |
| WO | 2005090426 | 9/2005 |
| WO | 2005090427 | 9/2005 |
| WO | 20070008765 | 1/2007 |
| WO | 2007035485 | 3/2007 |
| WO | 2009012215 | 1/2009 |
| WO | 20110032172 | 3/2011 |
| WO | 20110073047 | 7/2011 |
| WO | 2012103080 | 8/2012 |
| WO | WO 2012/103080 * | 8/2012 |
| WO | 2014105411 | 7/2014 |
| WO | 2015000851 | 1/2015 |
| WO | 2015017068 | 2/2015 |
| WO | 2017091720 | 6/2017 |
| WO | 2017173080 | 10/2017 |
| WO | 2019182719 | 9/2019 |
| WO | 2019182720 | 9/2019 |
| WO | 2019182721 | 9/2019 |
| WO | 2019182983 | 9/2019 |
| WO | 2019182986 | 9/2019 |
| WO | 2019182988 | 9/2019 |
| WO | 2019182992 | 9/2019 |
| WO | 2019182993 | 9/2019 |
| WO | 2020018159 | 1/2020 |

OTHER PUBLICATIONS

Long et al. Surface characteristics of hydro silylated polypropylene. Journal of Applied Polymer Science. vol. 88, Issue 14, pp. 3117-3131 2003.

Louis., "Karstedt Catalyst-Catalyzed stepgrowthh co-polyaddition of 1, 9-decadiene and 1,1, 3, 3,-tetramethyldisiloxane." Journal of Organometallic Chemistry. 2006, p. 2031-2036, vol. 691, No. 9. Elsevier, Amsterdam.

Malz, H. et al., Hydrosilylation of terminal Double Bonds Polymer Engineering and Science, Dec. 1998, vol. 38, No. 12. p. 1976-1984.

"Niemczyk., ""Study of thermal properties of polyethylene and polypropylenenanocomposites with long alkyl chain-substituted POSS fillers."" J. Them Anal Calorim. 2016, p. 1287-1299".

Rubinsztajn, et al., Macromolecules 2005, 38:1061. "A New polycondensation process for the preparation of polysiloxane copolymers".

Rudin., "Modern Methods of Polymer Characterization." John Wiley & Sons. 1991, p. 103-112, New York.

Saam, J et al. Dow Corning. J. Am. Chem. Soc. (1961) 83(6) 1351.

Shearer et al., Free radical hydrosilylation of polypropylene. Journal of Applied Polymer Science. vol. 65, Issue 3, 439-447 (1997).

"Silicones", Apr. 15, 2003 (Apr. 15, 2003), Encyclopedia of Polymer Science and Techno, Wiley, US, pp. 765-841, XP007918236, pp. 801-805.

Spanos, et al., surface segregation, Macromolecules, 2003, 36 (2), pp. 368-372.

Tolinski, M.; Additives for Polyolefins 2015, chapter 7, p. 71.

Uozumi., "Synthesis of Functionalized Alternating Olefin Copolymer and Modificationto Graft Copolymer by Hydrosilylation." 2000, p. 923-1292.

Waddon., "Crystal Structure of Polyhedral OligomericSilsequioxane (POSS) Nano-materials: A Study by X-rayDiffraction and Electron Microscopy" 2003, p. 4555-4561, vol. 15.

Waddon., "Nanostructured Polyethylene-POSSCopolymers: Control of Crystallizationand Aggregation." 2002, p. 1149-1155, vol. 2, No. 10.

Zhang, H X, et al., "Prepareation and properties of propylene/POSS copolymer with rac-Et (Ind) 2ZrXl2 catalyst", European Polymer Journal, Pergamon Press Ltd. Oxford, GB, vol. 45, No. 1, Jan. 1, 2009 (Jan. 1, 2009), pp. 40-46, XP025869132.

Zheng, et al.; Novel Polyolefin Nanocomposites; Macromolecules 2001; 34, 8034-8039.

Zhou, et al., "Palladium-Catalyzed Negishi Cross-Coupling Reactions of Unactivated Alkyl Iodides, Bromides, Chlorides, and Tosylates"; J. AM, Chem, Soc., vol. 125, No. 41, 2003, p. 12627-12630.

* cited by examiner

HOT MELT ADHESIVE COMPOSITION CONTAINING A POLYOLEFIN-POLYDIORGANOSILOXANE COPOLYMER AND METHODS FOR THE PREPARATION AND USE THEREOF

CROSS REFERENCE TO RELATED APPLICATIONS

This application is a U.S. national stage filing under 35 U.S.C. § 371 of PCT Application No. PCT/US19/019078 filed on 22 Feb. 2019, currently pending, which claims the benefit of U.S. Provisional Patent Application No. 62/644,826 and U.S. Provisional Patent Application No. 62/644,852, both filed on 19 Mar. 2018, under 35 U.S.C. § 119 (e). PCT Application No. PCT/US19/019078, PCT Application No. PCT/US19/019081, U.S. Provisional Patent Application No. 62/644,826 and U.S. Provisional Patent Application No. 62/644,852 are each hereby incorporated by reference are hereby incorporated by reference.

TECHNICAL FIELD

A polyolefin-polydiorganosiloxane block copolymer can be included in a polyorganosiloxane hot melt adhesive composition. The hot melt adhesive composition may harden to form an adhesive and/or a sealant via cooling, curing, or both. The hot melt adhesive composition is useful in electronic device assembly processes.

BACKGROUND

Conventional polyorganosiloxane hot melt adhesive compositions suffer from the drawback of having insufficient green strength and creep resistance for certain applications. Hydrocarbon waxes have been added to improve green strength. However, polyorganosiloxane hot melt adhesive compositions containing such hydrocarbon waxes may suffer from the drawbacks of insufficient green strength, and addition of such hydrocarbon waxes does not sufficiently improve creep resistance.

To increase productivity in assembly processes, such as electronic device assembly processes, there is an industry need for hot melt adhesive compositions with relatively low melt viscosity when dispensed that quickly build green strength upon cooling.

SUMMARY OF THE INVENTION

A hot melt adhesive composition comprises: (A) a polyolefin-polydiorganosiloxane block copolymer (copolymer), (B) a polydiorganosiloxane, and (C) a polyorganosilicate resin. A method for preparing the hot melt adhesive composition, and a method of use of the hot melt adhesive composition in an assembly process are also provided herein.

DETAILED DESCRIPTION OF THE INVENTION

The hot melt adhesive composition comprises: (A) the polyolefin-polydiorganosiloxane block copolymer, (B) the polydiorganosiloxane, and (C) the polyorganosilicate resin. The hot melt adhesive composition may harden by cooling, e.g., without curing. Alternatively, the hot melt adhesive composition may be reactive, e.g., by hydrosilylation reaction, by condensation reaction, or a combination thereof.

The reactive hot melt adhesive composition hardens by cooling and curing. The hot melt adhesive composition may further comprise one or more additional starting materials selected from the group consisting of: further comprising an additional starting material selected from the group consisting of (D) a catalyst, (E) a crosslinker, (F) an inhibitor, (G) a vehicle, (H) a moisture scavenger, (I) a filler, (J) a colorant, (K) a fluorescent brightener, (L) a corrosion inhibitor, (M) a thermal stabilizer, and combinations of two or more of (E), (F), (G), (H), (I), (J), (K), (L), and (M). When the hot melt adhesive composition is reactive, then the hot melt adhesive composition typically comprises (D) the catalyst and (E) the crosslinker in addition to (A) the polyolefin-polydiorganosiloxane block copolymer, (B) the polydiorganosiloxane, and (C) the polyorganosilicate resin. When the hot melt adhesive composition is reactive, then at least one of (A) the polyolefin-polydiorganosiloxane block copolymer, (B) the polydiorganosiloxane, and (C) the polyorganosilicate resin has a reactive substituent. When (E) the crosslinker is present, then at least one of (A) the polyolefin-polydiorganosiloxane block copolymer, (B) the polydiorganosiloxane, and (C) the polyorganosilicate resin has a reactive substituent capable of reacting with a reactive substituent on (E) the crosslinker. When (E) the crosslinker is absent from a reactive hot melt adhesive composition, then at least two of (A) the polyolefin-polydiorganosiloxane block copolymer, (B) the polydiorganosiloxane, and (C) the polyorganosilicate resin have a reactive substituent. Alternatively, all of starting materials (A), (B) and (C) may have reactive substituents in a reactive hot melt adhesive composition.

(A) Polyolefin-Polydiorganosiloxane Block Copolymer

Starting material (A) is the polyolefin-polydiorganosiloxane block copolymer. The polyolefin-polydiorganosiloxane block copolymer can be prepared as described in U.S. Patent Application Ser. No. 62/644,826 filed on Mar. 19, 2018, corresponding to PCT Publication Number WO2019182720, both of which are hereby incorporated by reference. The polyolefin-polydiorganosiloxane block copolymer may be prepared by a method comprising:

1) combining starting materials comprising:

A) a polyolefin having 1 to 2 terminal silyl groups per molecule, where the terminal silyl group has formula

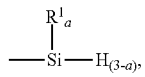

where each $R^1$ is an independently selected monovalent hydrocarbyl group and subscript a is 1 or 2 (silyl terminated polyolefin), B) a substantially linear polydiorganosiloxane having 1 to 2 hydrolyzable substituents (as described herein for $R^2$) capable of undergoing reaction with a silicon bonded hydrogen atom; and C) a Lewis Acid catalyst.

The starting materials may optionally further comprise one or more additional starting materials selected from the group consisting of D) a solvent, E) an alkoxysilyl-functional organosilicon compound having at least one silicon bonded hydrogen atom, and both D) and E).

Step 1) may be performed by any convenient means such as mixing at a temperature of 50° C. to 200° C., alternatively 100° C. to 120° C., at ambient pressure. Step 1) may be performed by any convenient means, such as solution processing (i.e., dissolving and/or dispersing the other starting materials in D) the solvent and heating) or melt extrusion (e.g., when solvent is not used or is removed during processing).

The method may optionally further comprise one or more additional steps. For example, the method may further comprise: 2) recovering the polyolefin-polydiorganosiloxane block copolymer after step 1). Recovering may be performed by any convenient means such as stripping and/or distillation to unwanted materials, e.g., catalyst, by-products, and/or unreacted starting materials. Alternatively, recovering may be performed by precipitation of the polyolefin-polydiorganosiloxane block copolymer in a non-solvent, thereby removing unwanted materials, optionally with water washing.

A) Silyl Terminated Polyolefin

Starting material A) is a polyolefin having 1 to 2 terminal silyl groups per molecule (silyl terminated polyolefin). The terminal silyl group has formula (A1):

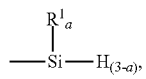

where each $R^1$ is an independently selected monovalent hydrocarbyl group and each subscript a is independently 1 or 2. Suitable monovalent hydrocarbyl groups for $R^1$ may have 1 to 20 carbon atoms, alternatively 1 to 12 carbon atoms, alternatively 1 to 8 carbon atoms, alternatively 1 to 4 carbon atoms, and alternatively 1 to 2 carbon atoms. Alternatively, the hydrocarbyl groups for $R^1$ may be selected from the group consisting of alkyl groups, alkenyl groups and aryl groups; alternatively alkyl and aryl; and alternatively alkyl. The alkyl groups are exemplified by methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbyl groups of 6 or more carbon atoms including cycloalkyl groups such as cyclopentyl and cyclohexyl. The alkenyl groups are exemplified by, but not limited to, vinyl, allyl, butenyl (including n-butenyl, iso-butenyl and t-butenyl), and hexenyl (including linear and branched isomers thereof). The aryl groups are exemplified by cyclopentadienyl, phenyl, tolyl, xylyl, anthracenyl, benzyl, 1-phenylethyl, 2-phenylethyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Alternatively, each $R^1$ may be independently selected from the group consisting of alkyl and aryl, alternatively methyl and phenyl. Alternatively, each $R^1$ may be methyl.

Alternatively, the silyl terminated polyolefin may have unit formula (A2):

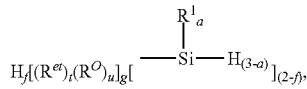

where subscript a and $R^1$ are as described above, subscript f is 0 to 1, subscripts t and u have relative values such that $0 < t \leq 1$, $0 \leq u \leq 1$, subscript g is 1 or more, each $R^{et}$ represents an ethylene unit, and each $R^O$ represents an olefin unit, other than ethylene. $R^O$ may be an alpha-olefin or a cyclic olefin.

Examples of alpha-olefins are as described below and include ethylene, propylene, and octene. Examples of cyclic olefins are as described below and include ethylidenenorbornene, norbornene, vinyl norbornene, cyclohexene, and cyclopentene. Alternatively, subscript g may be 1 to 500, alternatively 10 to 400, and alternatively 18 to 360. Alternatively, subscript g may have a value sufficient to give the silyl terminated polyolefin a Mn of 500 to 50,000 g/mol, alternatively 500 to 10,000 g/mol.

Alternatively, the silyl terminated polyolefin may have unit formula (A3):

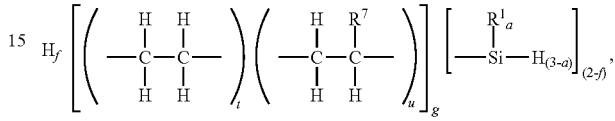

where subscripts a, f, g, t, and u, and $R^1$ are as described above. Each $R^7$ is independently a monovalent hydrocarbyl group of 2 to 20 carbon atoms. The monovalent hydrocarbyl group for $R^7$ may be alkyl, alkenyl or aryl; alternatively alkyl. Alternatively, $R^7$ may be an alkyl group of 2 to 12 carbon atoms, and alternatively 2 to 6 carbon atoms. Alternatively, each $R^7$ is a hexyl group.

Starting material A), the silyl terminated polyolefin, may have one terminal silyl group per molecule (i.e., where subscript f=1). Examples of this silyl-terminated polyolefin having a silyl group at one end of the polymer chain include dimethyl,hydrogensilyl-terminated polyethylene; dimethyl, hydrogensilyl-terminated poly(ethylene/octene) copolymer; methyl, dihydrogensilyl-terminated polyethylene; methyl, dihydrogensilyl-terminated poly(ethylene/octene) copolymer; diphenylhydrogensilyl-terminated polyethylene; diphenylhydrogensilyl-terminated poly(ethylene/octene) copolymer; phenyldihydrogensilyl-terminated polyethylene; phenyldihydrogensilyl-terminated poly(ethylene/octene) copolymer; chlorophenylhydrogensilyl-terminated polyethylene; or chlorophenylhydrogensilyl-terminated poly(ethylene/octene) copolymer. This silyl terminated polyolefin can be prepared by the processes described in U.S. patent application Ser. No. 62/644,635, filed on Mar. 19, 2018 corresponding to PCT Publication Number WO2019182992 and U.S. Patent Application Ser. No. 62/644,624, filed on Mar. 19, 2018 corresponding to PCT Publication Number WO2019182986 which are hereby incorporated by reference.

The silyl terminated polyolefin having one terminal silyl group per molecule may be prepared by a process comprising: 1) combining starting materials comprising: a) a polymeryl-metal, optionally b) a nitrogen containing heterocycle, and c) a halosilane; thereby forming a product comprising the silyl-terminated polyolefin. The starting materials may optionally further comprise d) a solvent. The process may optionally further comprise one or more additional steps selected from: 2) washing the product with water, and 3) recovering the product. The a) polymeryl-metal may be prepared by a process comprising combining starting materials comprising: i) an olefin monomer, ii) a catalyst, and iii) a chain shuttling agent of formula $R^F_N M$, where M is a metal atom from group 1, 2, 12, or 13 of the Period Table of Elements, each $R^F$ is independently a monovalent hydrocarbyl group of 1 to 20 carbon atoms, and subscript N is 1 to the maximum valence of the metal selected for M. In certain embodiments, M may be a divalent metal, including but not limited to calcium (Ca), magnesium, and zinc (Zn), and in this embodiment subscript N=2. In certain embodiments, M may be a trivalent metal, including but not limited to aluminium (Al), boron (B), and gallium (Ga), and in this embodiment subscript N=3. Alternatively, M may be either Zn or Al; and alternatively Zn. The monovalent hydrocarbyl group of 1 to 20 carbon atoms may be alkyl group (as defined herein), alternatively exemplified by ethyl, propyl, octyl, and combinations thereof. Suitable olefin monomers are disclosed for example, at col. 16, lines 5-36 of U.S. Pat. No. 7,858,706 and at col. 12, lines 7 to 41 of U.S. Pat. No. 8,053,529, which are hereby incorporated by reference. Examples of suitable olefin monomers include straight chain or branched alpha-olefins of 2 to 30 carbon atoms, alternatively 2 to 20 carbon atoms, such as ethylene, propylene, 1-butene, 3-methyl-1-butene, 1-pentene, 1-hexene, 4-methyl-1-pentene, 3-methyl-1-pentene, 1-octene, 1-decene, 1-dodecene, 1-tetradecene, 1-hexadecene, 1-octadecene, and 1-eicosene; cycloolefins of 3 to 30, alternatively 3 to 20 carbon atoms such as cyclopentene, cycloheptene, norbornene, 5-methyl-2-norbornene, tetracyclododecene, and 2-methyl-1,4,5,8-dimethano-1,2,3,4,4a,5,8,8α-octahydronaphthalene. Alternatively, starting material i) may comprise ethylene and optionally one or more olefin monomers other than ethylene, such as propylene or 1-octene. Alternatively, the olefin monomer may be ethylene and 1-octene. Alternatively, the olefin monomer may be ethylene. Suitable catalysts (and optional cocatalysts) are disclosed, for example, at col. 19, line 45 to col. 51, line 29 of U.S. Pat. No. 7,858,706, and col. 16, line 37 to col. 48, line 17 of U.S. Pat. No. 8,053,529, which are hereby incorporated by reference. Suitable chain shuttling agents include trialkyl aluminium and dialkyl zinc compounds, such as triethylaluminium, tri(isopropyl)aluminium, tri(isobutyl)aluminium, tri(n-hexyl)aluminium, tri(n-octyl)aluminium, triethylgallium, and diethylzinc. Suitable chain shuttling agents are disclosed at col. 16, line 37 to col. 19, line 44 of U.S. Pat. No. 7,858,706 and col. 12, line 49 to col. 14, line 40 of U.S. Pat. No. 8,053,529, which are hereby incorporated by reference.

The polymeryl-metal useful for preparing the silyl terminated polyolefin may be prepared using known process conditions and equipment, such as those disclosed in U.S. Pat. No. 7,858,706 to Arriola, et al. at col. 52, line 2 to col. 57, line 21 and U.S. Pat. No. 8,053,529 to Carnahan, et al.

The optional nitrogen containing heterocycle may be added, for example, when the polymeryl-metal is a polymeryl-zinc and the halosilane is a chlorosilane. The optional nitrogen containing heterocycle may have a general formula selected from the group consisting of:

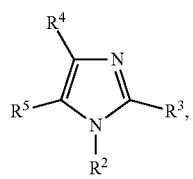

b1)

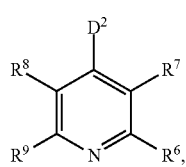

b2)

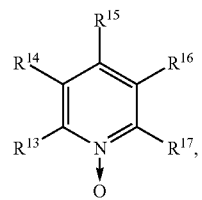

b3)

and mixtures of two or more of b1), b2), and b3), where in formulae b1), b2), and b3); where $R^2$ is a monovalent hydrocarbyl group, $R^3$ is a hydrogen atom or a monovalent hydrocarbyl group, $R^4$ is a hydrogen atom or a monovalent hydrocarbyl group, $R^5$ is a hydrogen atom or a monovalent hydrocarbyl group, $R^6$ is a hydrogen atom or a monovalent hydrocarbyl group, $R^7$ is a hydrogen atom or a monovalent hydrocarbyl group, $R^8$ is a hydrogen atom or a monovalent hydrocarbyl group, $R^9$ is a hydrogen atom or a monovalent hydrocarbyl group, and $D^2$ is an amino functional hydrocarbyl group or group of formula $-NR^{11}{}_2$, where each $R^{11}$ is a monovalent hydrocarbyl group, $R^{13}$ is a hydrogen atom or a monovalent hydrocarbyl group, $R^{14}$ is a hydrogen atom or a monovalent hydrocarbyl group, $R^{15}$ is a hydrogen atom or a monovalent hydrocarbyl group, $R^{16}$ is a hydrogen atom or a monovalent hydrocarbyl group, and $R^{17}$ is a hydrogen atom or a monovalent hydrocarbyl group. Suitable hydrocarbyl groups for $R^2$ to $R^{17}$ may have 1 to 12 carbon atoms, alternatively 1 to 8 carbon atoms, alternatively 1 to 4 carbon atoms, and alternatively 1 to 2 carbon atoms. Alternatively, the hydrocarbyl groups for $R^2$ to $R^{17}$ may be alkyl groups. The alkyl groups are exemplified by methyl, ethyl, propyl (including branched and linear isomers thereof), butyl (including branched and linear isomers thereof), and hexyl; alternatively methyl. Alternatively, each $R^3$ to $R^{10}$ may be selected from the group consisting of hydrogen and methyl. Alternatively, each $R^{13}$ to $R^{17}$ may be hydrogen. The nitrogen containing heterocycle used as the basic additive in the process may be selected from the group consisting of:

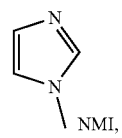

b4)

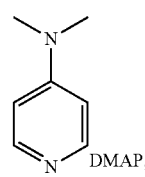

b5)

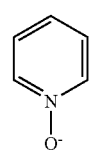

b6)

pyridine N-oxide, and mixtures of two or more of b4), b5), and b6).

When the nitrogen containing heterocycle is used, the resulting product may be recovered, e.g., by water washing to remove the nitrogen containing heterocycle before using the silyl-terminated polyolefin in the method for preparing the polyolefin-polydiorganosiloxane block copolymer described herein.

The halosilane may have formula $H_JR^{12}{}_KSiX_{(4-J-K)}$, where each $R^{12}$ is independently selected from hydrogen and a monovalent hydrocarbyl group of 1 to 18 carbon atoms, each X is independently a halogen atom, subscript J is 1 to 3, subscript K is 0 to 2, with the proviso that a quantity $(J+K) \leq 3$. Examples of suitable halosilanes include, but are not limited to: dihalosilanes such as methylhydrogendichlorosilane, methylhydrogendiiodosilane, methylhydrogenchloroiodosilane, ethylhydrogendichlorosilane, ethylhydrogendibromosilane, ethylhydrogendiiodosilane, ethylhydrogenchloroiodosilane, propylhydrogendichlorosilane, propylhydrogendibromosilane, propylhydrogendiiodosilane, propylhydrogenchloroiodosilane, phenylhydrogendichlorosilane, phenylhydrogendiiodosilane, phenylhydrogendibromosilane, and mixtures thereof. Examples of suitable halosilanes further include, but are not limited to: monohalosilanes such as dimethylhydrogenchlorosilane, dimethylhydrogenbromosilane, dimethylhydrogeniodosilane, diethylhydrogenchlorosilane, diethylhydrogeniodosilane, dipropylhydrogenchlorosilane, dipropylhydrogenbromosilane, dipropylhydrogeniodosilane, diphenylhydrogenchlorosilane, diphenylhydrogeniodosilane, diphenylhydrogenbromosilane, and mixtures thereof. Alternatively, the halosilane may be selected from the group consisting of c1) dimethylhydrogenchlorosilane, c2) diphenylhydrogenchlorosilane, c3) phenyldihydrogenchlorosilane, c4) phenylhydrogendichlorosilane, c5) dimethylhydrogeniodosilane, and mixtures of two or more of c1), c2), c3), c4), and c5).

Starting material (d) a solvent may optionally be used in step 1) of the process for making the silyl terminated polyolefin. The solvent may be a hydrocarbon solvent such as an aromatic solvent or an isoparaffinic hydrocarbon solvent. Suitable solvents include but are not limited to a non-polar aliphatic or aromatic hydrocarbon solvent selected from the group of pentane, hexane, heptane, octane, nonane, decane, undecane, dodecane, cyclopentane, methylcyclopentane, cyclohexane, methylcyclohexane, cycloheptane, cyclooctane, decalin, benzene, toluene, xylene, an isoparaffinic fluid including but not limited to Isopar™ E, Isopar™ G, Isopar™ H, Isopar™ L, Isopar™ M, a dearomatized fluid including but not limited to Exxsol™ D or isomers and mixtures of two or more thereof. Alternatively, the solvent may be toluene and/or Isopar™ E.

Alternatively, starting material A), the silyl terminated polyolefin, may have two silyl terminal groups per molecule (i.e., in formulae (A2) and (A3) where subscript f=0, the silyl terminated polyolefin in is telechelic. Such telechelic silyl terminated polyolefins may be prepared by methods, such as those disclosed in U.S. Patent Application Ser. No. 62/644,808, filed on Mar. 19, 2018 and corresponding to PCT Publication Number WO2019182993, which are both hereby incorporated by reference. Telechelic silyl terminated polyolefins may be prepared, for example, by a process comprising: 1) combining starting materials comprising a') a silicon-terminated organo-metal and c) the halosilane (as described above), thereby obtaining a product comprising the silyl-terminated polyolefin. In further embodiments, the starting materials of this process may further comprise b) the nitrogen containing heterocycle (as described above). The starting materials of this process may optionally further comprise d) the solvent (as described above).

The process may optionally further comprise one or more additional steps. For example, the process may further comprise: 2) recovering the telechelic silyl terminated polyolefin. Recovering may be performed by any suitable means, such as precipitation and filtration, optionally with water washing, thereby removing unwanted materials.

The amount of each starting material depends on various factors, including the specific selection of each starting material. However, in certain embodiments, a molar excess of starting material c) may be used per molar equivalent of starting material a'). For example, the amount of starting material c) may be 2 to 3 molar equivalents per molar equivalent of starting material a'). If starting material b) is used, the amount of starting material b) may be 2 molar equivalents per molar equivalent of starting material a').

The amount of d) solvent will depend on various factors, including the selection of starting materials a'), c), and, if present, b). However, the amount of d) solvent may be 65% to 95% based on combined weights of all starting materials used in step 1).

Starting material a') may be a silicon-terminated organo-metal having the formula (II) or (III):

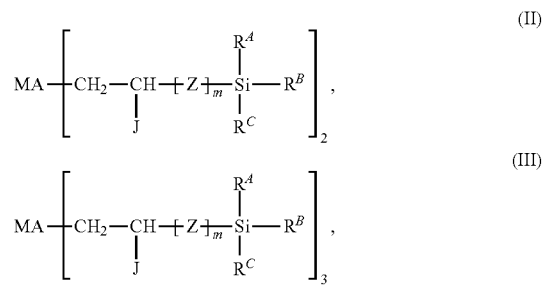

where

MA is a divalent metal selected from the group consisting of Zn, Mg, and Ca;

MB is a trivalent metal selected from the group consisting of Al, B, and Ga;

each Z is an independently selected divalent hydrocarbyl group of 1 to 20 carbon atoms;

subscript m is a number from 1 to 100,000;

each J is independently a hydrogen atom or a monovalent hydrocarbyl group of 1 to 20 carbon atoms;

each $R^A$, $R^B$, and $R^C$ is independently selected from the group consisting of a hydrogen atom, a monovalent hydrocarbyl group of 1 to 10 carbon atoms, a vinyl group, an alkoxy group, or one or more siloxy units selected from M, D, and T units:

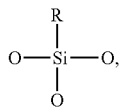
(T unit)

wherein each R is independently a hydrogen atom, a monovalent hydrocarbyl group of 1 to 10 carbon atoms, or cyclic, a vinyl group, or an alkoxy group;

two or all three of $R^A$, $R^B$, and $R^C$ may optionally be bonded together to form a ring structure when two or all three of $R^A$, $R^B$, and $R^C$ are each independently one or more siloxy units selected from D and T units.

In certain embodiments, subscript m of formulas (II) and (III) is a number from 1 to 75,000, from 1 to 50,000, from 1 to 25,000, from 1 to 10,000, from 1 to 5,000, from 1 to 2,500, and/or from 1 to 1,000.

In certain embodiments of formula (II), MA is Zn. In certain embodiments of formula (III), MB is Al. In further embodiments of formula (II), J is an ethyl group. In further embodiments of formula (III), J is a hydrogen atom.

Prior to this process, the silicon-terminated organo-metal may be prepared according to the disclosures of U.S. patent application Nos. 62/644,654 and 62/644,664 both filed on Mar. 19, 2018, corresponding to PCT Publication Numbers WO2019182988 and WO2019182983, respectively, which are all hereby incorporated by reference.

For example, in certain embodiments, the silicon-terminated organo-metal may be prepared by a process comprising combining starting materials comprising: (a) a vinyl-terminated silicon-based compound, (b) a chain shuttling agent, (c) a procatalyst, (d) an activator, (e) an optional solvent, and (f) an optional scavenger, thereby obtaining a product comprising the silicon-terminated organo-metal.

Alternatively, the silicon terminated organo-metal may be prepared by a process comprising combining starting materials at an elevated temperature, the starting materials comprising: (a) the vinyl-terminated silicon-based compound, (b) the chain shuttling agent, and optionally (e) the solvent. This process may be conducted at a temperature of 60° C. to 200° C., alternatively 80° C. to 180° C., and alternatively 100° C. to 150° C. This process may be conducted for a duration of from 30 minutes to 200 hours.

In certain embodiments, (a) the vinyl-terminated silicon-based compound may have the formula (IV):

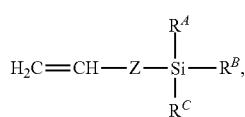
(IV)

where Z, $R^A$, $R^B$, and $R^C$ are as described above.

In certain embodiments, the (b) chain shuttling agent may have the formula $R^F{}_N M$, where $R^F$, M and subscript N are as described above.

In certain embodiments, (c) the procatalyst may be any compound or combination of compounds capable of, when combined with an activator, polymerization of unsaturated monomers. Suitable procatalysts include but are not limited to those disclosed in WO 2005/090426, WO 2005/090427, WO 2007/035485, WO 2009/012215, WO 2014/105411, WO 2017/173080, U.S. Patent Publication Nos. 2006/0199930, 2007/0167578, 2008/0311812, and U.S. Pat. Nos. 7,355,089 B2, 8,058,373 B2, and 8,785,554 B2. The nitrogen containing heterocycle and the halosilane are as described above for starting materials b) and c) used to make the silyl terminated polyolefin having one terminal silyl group per molecule.

In certain embodiments, the (d) activator may be any compound or combination of compounds capable of activating a procatalyst to form an active catalyst composition or system. Suitable activators include but are not limited to Brønsted acids, Lewis acids, carbocationic species, or any activator known in the art, including but limited to those disclosed in WO 2005/090427 and U.S. Pat. No. 8,501,885 B2. In exemplary embodiments, the co-catalyst is $[(C_{16\text{-}18}H_{33\text{-}37})_2CH_3NH]$ tetrakis(pentafluorophenyl)borate salt.

In certain embodiments, the (e) optional solvent may be any solvent disclosed above as starting material (d) or as described below.

In further embodiments, the silicon-terminated organo-metal prepared by the processes described above may be followed by a subsequent polymerization step. Specifically, the silicon-terminated organo-metal prepared by the processes as described above may be combined with at least one olefin monomer, a procatalyst as defined herein, an activator as defined herein, and optional materials, such as solvents and/or scavengers, under polymerization process conditions known in the art, including but not limited to those disclosed in U.S. Pat. Nos. 7,858,706 and 8,053,529. Such a polymerization step essentially increases the subscript n in the formula (I) and the subscript m in formulas (II) and (III). Examples of suitable olefin monomers for use in the polymerization step are as described above.

As described below, the silicon-terminated organo-metal may also be prepared by combining starting materials comprising 6-bromo-1-hexene, THF, and chlorodimethylsilane to form hex-5-en-1-yldimethylsilane, followed by combining hex-5-en-1-yldimethylsilane, triethylborane, a borane-dimethylsulfide complex, and diethyl zinc to form the silicon terminated organo-metal.

Alternatively, the silicon-terminated organo-metal may be prepared in a batch reactor using a process as described below in Reference Example H, by varying appropriate starting materials, i.e., the olefin monomers, catalysts, chain shuttling agents, catalysts, procatalysts, activators, and solvents, suitable examples of which are described herein. Step 1) of combining the starting materials may be performed by any suitable means, such as mixing at a temperature of 50° C. to 200° C., alternatively 100° C. to 120° C., at ambient pressure. Heating may be performed under inert, dry conditions. In certain embodiments, step 1) of combining the starting materials may be performed for a duration of 30 minutes to 20 hours, alternatively 1 hour to 10 hours. In further embodiments, step 1) of combining the starting materials may be performed by solution processing (i.e., dissolving and/or dispersing the starting materials in (d) solvent and heating) or melt extrusion (e.g., when (d) solvent is not used or is removed during processing).

The silicon-terminated organo-metal prepared as described above for starting material (a') may then be combined with (c) the halosilane, and optionally (b) the nitrogen containing heterocycle, and/or (d) the solvent, which are as described above thereby producing the telechelic silyl terminated polyolefin.

Alternatively, the silyl terminated polyolefin may be prepared in a solution polymerization process, wherein the polyolefin polymer is made by a method comprising: a) combining i) the olefin monomer, ii) the catalyst, and the iii) chain shuttling agent described above to prepare iv) a polymeryl metal; b) combining iv) the polymeryl-metal, v) the halosilane, and optionally v) the nitrogen containing heterocycle; where steps a) and b) are performed in a solution. In the solution, the resulting silyl terminated polyolefin may comprise 10% to 20% of the total weight of the reaction mixture. The balance typically comprises unreacted olefin monomer and an unreactive solvent. Commercial processes are typically done in a continuous reactor, where fresh olefin monomer and catalyst are continuously fed to reach a steady state conversion to polyolefin, and the polyolefin is removed at a rate commensurate with these feeds and the conversion to polyolefin. In these systems, the olefin monomer is not completely converted to polyolefin. For example, in the case of a copolymerization of ethylene and an alpha-olefin, the effluent from the reactor typically contains unreacted monomers, 10% of the ethylene and >50% of the alpha-olefin. After polymerization, the solvent and unreacted monomers may be removed by a devolatilization process to leave solid silyl terminated polyolefin.

After devolatilization of the silyl terminated polyolefin, the starting materials comprising the silyl terminated polyolefin, the polydiorganosiloxane, and the catalyst may be combined in step 1) of the method described above for making the polyolefin-polydiorganosiloxane block copolymer. Alternatively, the devolatilization step may be eliminated, i.e., the mixture formed after step b) may be used to deliver starting material A) the silyl terminated polyolefin in step 1) of the method described herein. This method for preparing the polyolefin-polydiorganosiloxane block copolymer described herein may provide the advantage that coupling the polydiorganosiloxane with the silyl terminated polyolefin may be conducted in the presence of the unreacted olefinic monomers (e.g., in solution, without the devolatilization of the silyl terminated polyolefin as described above). In this type of system, the polydiorganosiloxane could be fed into a second reactor along with the effluent from the continuous reactor described above for making the silyl terminated polyolefin. The chemistry in the second reactor would not involve reaction of the olefin and, therefore, it is expected this could be conducted in the presence of olefinic monomers without detrimental effect on coupling efficiency. This represents a benefit over prior processes, in which the unreacted monomer from the continuous reactor presented a challenge for doing the coupling through hydrosilylation in a second reactor before devolatilization. In this prior process, concentration of the free olefinic monomer was much higher than the concentration of a vinyl-terminated polyolefin, and therefore the coupling efficiency was poor between the siloxane and polyolefin, unless the olefin monomer was removed before this second reaction. The present invention may provide the benefit of enabling efficient coupling in a second reactor in solution, and then the resulting polyolefin-polydiorganosiloxane block copolymer may be devolatilized. Therefore, in one embodiment of the invention, the method may further comprise: i) forming A) the silyl terminated polyolefin described herein, in a mixture with unreacted monomer and optionally solvent, and ii) combining the mixture, B) the substantially linear polydiorganosiloxane described above, and C) the Lewis Acid catalyst in step 1) of the method described above.

Starting material A) may be one silyl terminated polyolefin or may comprise two or more silyl terminated polyolefins differing in at least one of the following properties: structure, viscosity, average molecular weight, olefin blocks, and sequence. Alternatively, starting material A) may comprise a mixture of silyl terminated polyolefins, wherein both the silyl terminated polyolefin having one terminal silyl group per molecule (mono-terminated silyl terminated polyolefin) and the telechelic silyl terminated polyolefin are used in the mixture for starting material A).

The amount of starting material A) used in step 1) of the method for making the copolymer described herein will depend on various factors including whether a mixture of mono-terminated silyl terminated polyolefin and telechelic silyl terminated polyolefin is used, the desired architecture of the polyolefin-polydiorganosiloxane block copolymer to be formed, and the selection of starting material B), however, the amount of starting material A) may be 5% to 95% based on combined weights of all starting materials combined in step 1). Alternatively, the amount of starting material A) may be 10% to 60%, and alternatively 10% to 40%, on the same basis.

B) Polydiorganosiloxane

In the method for making the copolymer, starting material B) is a polydiorganosiloxane having, per molecule, 1 to 2 hydrolyzable substituents capable of undergoing reaction with the silicon bonded hydrogen atom of starting material A). The polydiorganosiloxane is substantially linear, alternatively is linear.

Starting material B) may comprise a polydiorganosiloxane of formula (B1):

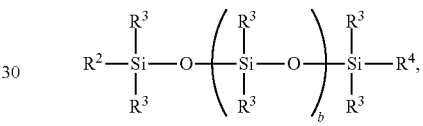

where each $R^2$ is independently a hydrolyzable substituent, each $R^3$ is independently a hydrogen atom or a monovalent organic group free of hydrolyzable functionality, $R^4$ is selected from $R^2$ and $R^3$, and subscript b is 0 or a positive number. Alternatively, subscript b has an average value of at least 2. Alternatively subscript b may be 2 to 2000. Alternatively, subscript b may be 10 to 1,000. Alternatively, subscript b may be 30 to 500.

The hydrolyzable substituents for $R^2$ may be any hydrolyzable substituent capable of reacting with the silicon bonded hydrogen atom of starting material A). Exemplary hydrolyzable substituents include halogen atoms such as chlorine or iodine; amido groups such as acetamido groups, benzamido groups, or methylacetamido groups; acyloxy groups such as acetoxy groups; hydrocarbonoxy groups such as alkoxy groups or alkenyloxy groups; amino groups; aminoxy groups; hydroxyl groups; mercapto groups; oximo groups; ketoximo groups; alkoxysilylhydrocarbylene-functional groups; or a combination thereof. Alternatively, each $R^2$ may be an alkoxy group. Alternatively, each $R^2$ may be selected from an alkoxy group and a hydroxyl group. Alternatively, each $R^2$ may be methoxy. Alternatively, each $R^2$ may be a hydroxyl group.

Suitable monovalent organic groups for $R^3$ include monovalent hydrocarbyl groups and monovalent halogenated hydrocarbyl groups. Examples of monovalent hydrocarbyl groups include, but are not limited to, alkyl such as those described above for $R^1$ and aryl such as those described above for $R^1$. Examples of monovalent halogenated hydrocarbon groups include, but are not limited to, chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5, 4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Examples of other monovalent organic groups include, but are not limited to, hydrocarbyl groups substituted with oxygen atoms such as glycidoxyalkyl, and hydrocarbon groups substituted with nitrogen atoms such as aminoalkyl and cyano-functional groups such as cyanoethyl and cyanopropyl. Alternatively, each $R^3$ is a monovalent hydrocarbyl group exemplified by alkyl and aryl, alternatively methyl and phenyl.

In one embodiment, each $R^4$ is an $R^3$ group, as described above. Alternatively, each $R^4$ is an $R^2$ group, as described above. Alternatively, a mixture of polydiorganosiloxanes may be used as starting material B), wherein some instances of $R^4$ are $R^3$ and other instances of $R^4$ are $R^2$. Starting material B) may be one polydiorganosiloxane or may comprise two or more polyorganosiloxanes differing in at least one of the following properties: structure, viscosity, average molecular weight, siloxane units, and sequence.

Starting material B) may comprise a polydiorganosiloxane such as i) α,ω-dimethylhydroxylsiloxy-terminated, polydimethylsiloxane;

ii) α-dimethylhydroxylsiloxy-terminated, w-trimethylsiloxy-terminated, polydimethylsiloxane;

iii) α,ω-dimethylhydroxylsiloxy-terminated poly(dimethylsiloxane/methylphenylsiloxane);

iv) α-dimethylhydroxylsiloxy-terminated, w-trimethylsiloxy-terminated, poly(dimethylsiloxane/methylphenylsiloxane);

v) α,ω-(phenyl,methyl,hydroxyl-siloxy)-terminated, polydimethylsiloxane;

vi) α,ω-dimethylmethoxysiloxy-terminated polydimethylsiloxane;

vii) α-dimethylmethoxysiloxy-terminated, w-trimethylsiloxy-terminated, polydimethylsiloxane;

viii) a combination of two or more of i), ii), iii), iv), v), vi), and vii).

Methods of preparing polydiorganosiloxanes suitable for use as starting material B), such as hydrolysis and condensation of the corresponding organohalosilanes or equilibration of cyclic polydiorganosiloxanes, are well known in the art.

The amount of starting material B) used in step 1) of the method described herein will depend on various factors including whether a mixture of mono-terminated and telechelic polydiorganosiloxanes is used, the desired architecture of the polyolefin-polydiorganosiloxane block copolymer to be formed, and the selection of starting materials A) and B), however, the amount of starting material B) may be 5% to 95% based on combined weights of all starting materials combined in step 1). Alternatively, the amount of starting material B) may be 10% to 60%, and alternatively 10% to 40%, on the same basis.

C) Catalyst

In the method for making the copolymer, starting material C), the catalyst, may be a Lewis Acid catalyst. Lewis Acid catalysts, such as those containing boron are suitable. Alternatively, the Lewis acid catalyst may be a trivalent boron compound with at least one perfluoroaryl group, alternatively 1 to 3 perfluoroaryl groups per molecule, alternatively 2 to 3 perfluoroaryl groups per molecule, and alternatively 3 perfluoroaryl groups per molecule. The perfluoroaryl groups may have 6 to 12 carbon atoms, alternatively 6 to 10, and alternatively 6 carbon atoms. For example, the Lewis Acid catalyst may be selected from $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})B(C_6F_5)$; $(C_6F_5)_2B(OC_2H_5)$; or $(C_6F_5)_2B-CH_2CH_2Si(CH_3)$. Alternatively, starting material C) may be a Piers-Rubinsztajn reaction catalyst of formula $B(C_6F_5)_3$, tris(pentafluorophenyl)borane.

The amount of catalyst used in step 1) of the method described herein will depend on various factors including the selection of starting materials A) and B) and their respective contents of silicon bonded hydrogen atoms and hydrolyzable substituents and the temperature during step 1), however, the amount of catalyst is sufficient to catalyze reaction of starting materials comprising A) and B), alternatively the amount of catalyst is sufficient to provide 0.0001 to 0.1 molar equivalents of catalyst per molar equivalent of hydrolyzable substituents of starting material B), alternatively 0.001 to 0.1, and alternatively 0.005 to 0.05 molar equivalents, on the same basis.

D) Solvent

Starting material D) may optionally be added during the method for making the copolymer described above. The solvent may be an organic solvent, exemplified by D1) a ketone such as acetone, methylethyl ketone, or methyl isobutyl ketone; D2) an aromatic hydrocarbon such as benzene, toluene, or xylene; D3) an aliphatic hydrocarbon such as heptane, hexane, or octane; D4) a glycol ether such as propylene glycol methyl ether, dipropylene glycol methyl ether, propylene glycol n-butyl ether, propylene glycol n-propyl ether, or ethylene glycol n-butyl ether; D5) a halogenated hydrocarbon such as dichloromethane, 1,1,1-trichloroethane or methylene chloride; D6) chloroform; D7) dimethyl sulfoxide; D8) dimethyl formamide; D9) acetonitrile; D10) tetrahydrofuran; D11) white spirits; D12) mineral spirits; D13) naphtha; D14) an isoparaffin such as Isopar™ E commercially available from ExxonMobil Chemical Company; or a combination of two or more of D1), D2), D3), D4), D5), D6), D7), D8), D9), D10), D11), D12), D13), and D14).

The amount of solvent will depend on various factors including the type of solvent selected and the amount and type of other starting materials selected for use in step 1) of the method the polyolefin-polydiorganosiloxane block copolymer described herein. However, when present, the amount of solvent may range from 1% to 99%, alternatively 2% to 50%, based on combined weights of all starting materials combined in step 1). The solvent can be added during combining the starting materials comprising A), B), and C), for example, to aid mixing and delivery. Alternatively, one or more of the starting materials may be dissolved in the solvent before combining with the other starting materials in step 1) of the method described herein.

Starting Material E) Alkoxysilyl-Functional Organosilicon Compound

Starting material E) is an alkoxysilyl-functional organosilicon compound having at least one silicon bonded hydrogen atom. Examples of suitable alkoxysilyl-functional organosilicon compounds are exemplified by alkoxy-functional organohydrogensiloxane oligomers of unit formula (E1):

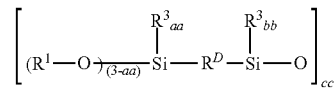

-continued $(HR^3{}_2SiO_{1/2})_{dd}(R^3{}_3SiO_{1/2})_{ee}(HR^3SiO_{2/2})_{ff}$ $(R^3{}_2SiO_{2/2})_{gg}(R^3SiO_{3/2})_{hh}(HSiO_{3/2})_{ii}(SiO_{4/2})_{jj}$, where $R^1$ and $R^3$ are as described above; each subscript aa is independently 0, 1, or 2; alternatively 0 or 1; each subscript bb is independently 0, 1, or 2; subscript cc >0; each $R^D$ is independently a divalent hydrocarbyl group of 2 to 18 carbon atoms; subscript dd≥0, subscript ee has a value such that 5≥ee≥0, subscript ff≥0, subscript gg≥0, subscript hh>0, subscript ii≥0, and subscript jj≥0, and a quantity (cc+dd+ee+ff+gg+hh+ii+jj)≤50. Suitable divalent hydrocarbyl groups for $R^D$ are exemplified by an alkylene group such as ethylene, propylene, butylene, or hexylene; an arylene group such as phenylene, or an alkylarylene group such as:

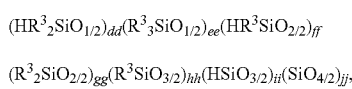

Alternatively, each $R^D$ is a group of formula $-C_2H_4-$. Examples of such alkoxy-functional organohydrogensiloxane oligomers may be prepared by the methods in U.S. Pat. No. 3,175,993 to Weyenberg and U.S. Provisional Patent Application Ser. Nos. 62/524,636, 62/524,637, and 62/524,639, all of which were filed on 26 Jun. 2017, corresponding to U.S. Patent Application Publication Numbers US20200140618, US20200231756, and US20200231755, respectively, and all of which are hereby incorporated by reference.

Alternatively, starting material E) may have formula (E2):

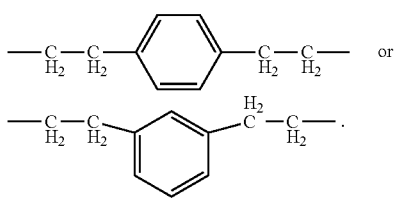

where $R^1$ $R^3$, $R^D$, and subscript aa are as described above, and subscript D is 0 to 20, alternatively 1 to 10.

Alternatively, starting material E) may have formula (E3):

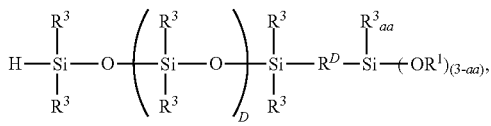

where $R^1$ $R^3$, $R^D$, and subscript aa are as described above.

Alternatively, starting material E) may comprise formula (E4), (E5), or both, where formula (E4) is

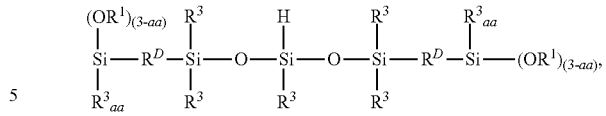

and formula (E5) is

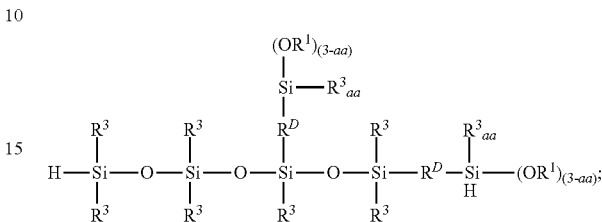

where $R^1$ $R^3$, $R^D$, and subscript aa are as described above.

Alternatively, starting material E) may have unit formula (E6):

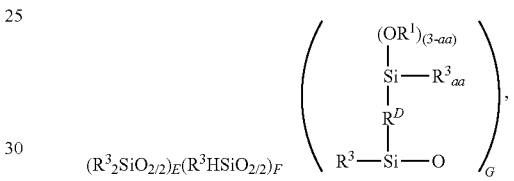

where $R^1$, $R^3$, $R^D$, and subscript aa are as described above, subscript E is 0 or more, subscript F is 1 or more, and subscript G is 1 or more and 4≤(E+F+G)≤50.

In unit formula (I) for the polyolefin-polydiorganosiloxane block copolymer described herein, group $R^{10}$ forms as a reaction product of the silicon bonded hydrogen atom of starting material E) and a hydrolyzable substituent group of starting material B). When starting material E) is included, starting material B) comprises a telechelic polydiorganosiloxane. The amounts of starting materials B) and E) may be selected such that up to 1.05 molar equivalent of starting material E) to 1 molar equivalent of hydrolyzable substituents in the telechelic polydiorganosiloxane for starting material B) is present (E:B molar ratio). Alternatively, E:B molar ratio may be 1.05:1 to 1:1, for example, when a triblock copolymer with BAB architecture will be formed. In one embodiment, starting materials A), B), C), and E) may be combined concurrently in step 1). Alternatively, starting materials A), B), and C) may be combined in amounts such that one hydrolyzable substituent (from starting material B)) at a terminus of the polyolefin-polydiorganosiloxane block copolymer remains unreacted with the SiH from starting material A), and thereafter starting material E) is added such that the SiH on starting material E) reacts with the remaining hydrolyzable substituent from starting material B). In this manner, a copolymer with BAB architecture, or a copolymer with B(AB)n architecture may be prepared comprising alkoxy-silyl hydrocarbylene functional terminal groups.

The polyolefin-polydiorganosiloxane block copolymer prepared as described above comprises unit formula (I):

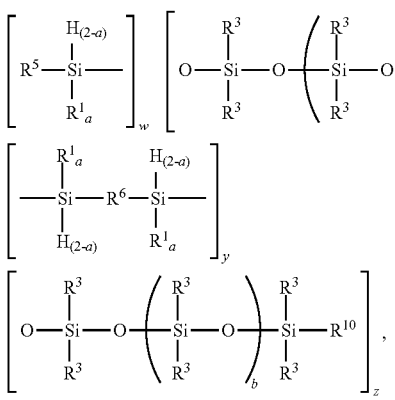

where $R^1$, $R^3$, subscript a, and subscript b are as described above.

Each $R^5$ is an independently selected hydrogen terminated polyolefinic block. Each $R^5$ may have unit formula: $H[(R^{et})_t(R^O)_u]_g$, where $R^{et}$, $R^O$, and subscripts t, u and g are as described above. Alternatively, each $R^5$ may have unit formula (II): $H[(CH_2CH_2)_t(CHR^7CH_2)_u]_g$, where $R^7$ and subscripts t, u, and g are as described above. Alternatively, the hydrogen terminated polyolefinic block may be a hydrogen terminated ethylene polymeric block. Alternatively, the divalent polyolefinic block may be a hydrogen terminated ethylene-octene copolymeric block.

Each $R^6$ is an independently selected divalent polyolefinic block. Each $R^6$ may have unit formula $[(R^{et})_t(R^O)_u]_g$, where $R^{et}$, $R^O$, and subscripts t, u and g are as described above. Alternatively, each $R^6$ may have unit formula (III): $[(CH_2CH_2)_t(CHR^7CH_2)_u]_g$ where $R^7$ and subscripts t, u, and g are as described above. Alternatively, the divalent polyolefinic block may be a divalent ethylene polymeric block. Alternatively, the divalent polyolefinic block may be a divalent ethylene-octene copolymeric block.

Each $R^{10}$ is independently selected from $R^3$ and an alkoxysilyl functional hydrocarbylene containing group. In one embodiment, each $R^{10}$ is $R^3$ (i.e., when starting material E) is not used to prepare the polyolefin-polydiorganosiloxane block copolymer). Alternatively, at least some instances of $R^{10}$ may have a formula selected from:

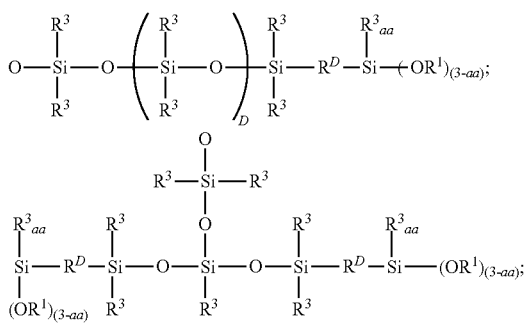

one or both of

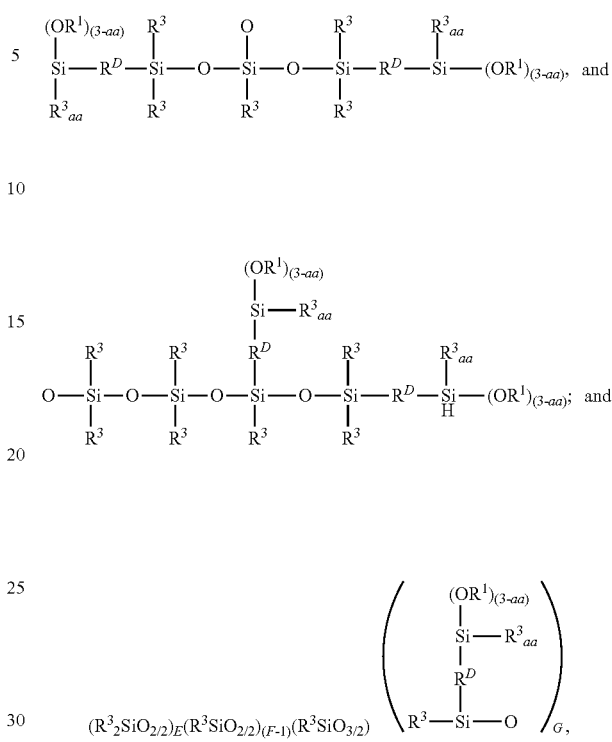

where $R^1$, $R^3$, $R^D$, and subscripts aa, D, E, F, and G are as described above.

In unit formula (I) above, subscript w is 0 to 2. Subscript x is 0 or a positive number. Subscript y is 0 or a positive number. Subscript z is 0 to 2. A quantity (w+y)≥1. A quantity (x+z)≥1. When subscript w=0, subscript z is >0. When subscript z=0, subscript w>0.

In one embodiment, in unit formula (I), subscript x=0, subscript y=0, subscript w=1 and subscript z=1. In this embodiment, the polyolefin-polydiorganosiloxane block copolymer has an AB architecture. In this embodiment, the copolymer has formula (IV):

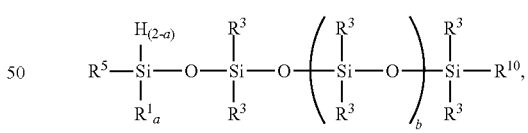

where $R^1$, $R^3$, $R^5$, $R^{10}$, subscript a, and subscript b are as described above.

In an alternative embodiment, in unit formula (I), subscript w=2, subscript z=0, subscript x≥1, and subscript y≥0. In this embodiment, the copolymer has formula (V):

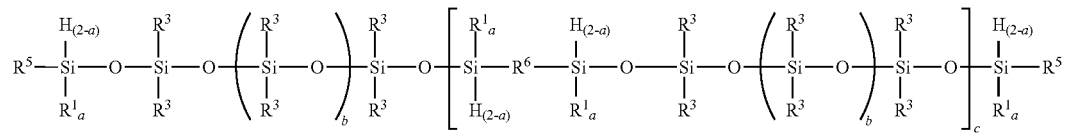

where $R^1$, $R^3$, $R^5$, $R^6$, subscript a, and subscript b are as described above; and subscript c is 0 or a positive number. Alternatively, subscript c may be 1 to 1,000; alternatively 2 to 1,000; alternatively 1 to 100, and alternatively 2 to 100. Alternatively, subscript c>0 in formula (V), i.e., when in unit formula (I), subscript w=2, subscript x>1, subscript y>1, and subscript z=0. Alternatively, when subscript c=0, the copolymer has an (ABA) architecture.

In an alternative embodiment, in unit formula (I), subscript w=2, subscript x=1, subscript y=0 and subscript z=0, and the copolymer has an (ABA) architecture. This copolymer has formula (VI):

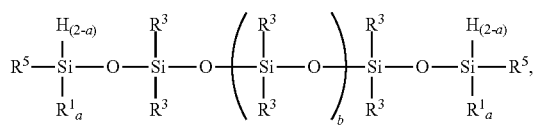

where $R^1$, $R^3$, $R^5$, subscript a, and subscript b are as described above. This copolymer can be made in the method described above where starting material A) has one silyl terminal group per molecule and starting material B) has two hydrolyzable substituents per molecule (telechelic).

In an alternative embodiment, in unit formula (I), subscript z=2, subscript w=0, subscript x≥0, and subscript y≥1, and the copolymer has formula (VII):

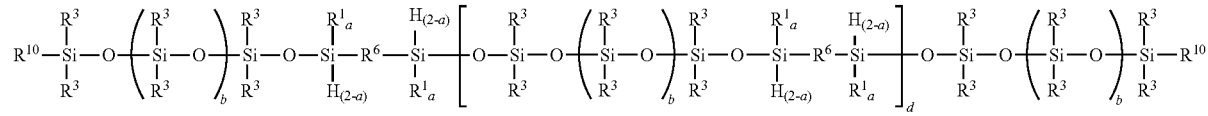

where $R^1$, $R^3$, $R^6$, $R^{10}$, subscript a, and subscript b are as described above; and subscript d is 0 or a positive number. Alternatively, subscript d may be 1 to 1,000; alternatively 2 to 1,000; alternatively 1 to 100, and alternatively 2 to 100. Alternatively, subscript d>0 in formula (VII), i.e., when in unit formula (I), subscript w=0, subscript x>1, subscript y>1, and subscript z=2. Alternatively, subscript d=0, and the copolymer has a (BAB) architecture.

In an alternative embodiment, in unit formula (I), subscript w=0, subscript x=1, subscript y=0 and subscript z=2, and the copolymer has formula (VIII):

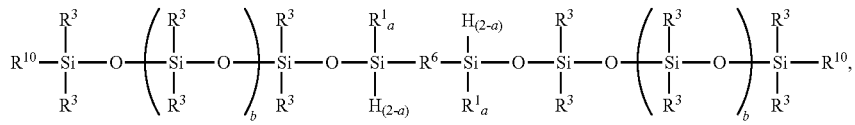

where $R^1$, $R^3$, $R^6$, $R^{10}$, subscript a, and subscript b are as described above. This copolymer can be made in the method described above where starting material B) has one hydrolyzable substituent per molecule, and starting material A) is telechelic.

Alternatively, any one of formulae (I) and (IV) to (VIII) may have one or more of: each $R^1$ being methyl and each $R^3$ being methyl. In this embodiment, each $R^5$ may be hydrogen terminated polyethylene or hydrogen terminated poly(ethylene/octene) and each $R^6$ may be polyethylene or poly(ethylene/octene). Any one or more of the polyolefin-polydiorganosiloxane copolymers prepared as described above may be used as starting material (A) in the hot melt adhesive composition.

(B) Polydiorganosiloxane

The polydiorganosiloxane useful as starting material (B) in the hot melt adhesive composition may be substantially linear, alternatively is linear. The polydiorganosiloxane comprises difunctional units ("D" units) of formula $X^3_{kk}R^3_{(2-kk)}SiO_{2/2}$ and terminal of formula $X^3_{mm}R^M_{(3-mm)}SiR^{L1}$, where each $R^M$ is an independently selected monovalent organic group such as that described above for $R^3$; each $X^3$ is an independently selected hydrolyzable substituent, subscript kk is 0 or 1; subscript mm is 0, 1, or 2, and $R^{L1}$ is an oxygen atom or a divalent hydrocarbyl group linking the silicon atom of the terminal unit with another silicon atom. The polydiorganosiloxane can optionally contain up to 20% based on total of trifunctional units ("T" units) of formula $R^MSiO_{3/2}$, where $R^M$ is as described above.

Alternatively, in (B) the polydiorganosiloxane, each $R^M$ may be independently selected from the group consisting of alkyl, alkenyl and aryl Alternatively, each $R^M$ may be selected from methyl, vinyl and phenyl. Alternatively, at least 50%, alternatively at least 80% of the $R^M$ groups are alkyl groups of 1 to 4 carbon atoms, alternatively are methyl groups. Alternatively, the terminal units in the polydiorganosiloxane may be exemplified by $(Me_3SiO_{1/2})$, $(Me_2PhSiO_{1/2})$, and $(Me_2ViSiO_{1/2})$, and the D units may be exemplified by $(Me_2SiO_{2/2})$ and $(MePhSiO_{2/2})$.

In the formula for the terminal unit, $R^{L1}$ is an oxygen atom, a divalent hydrocarbyl group, or a combination of a divalent hydrocarbyl group and a divalent siloxane group. $R^{L1}$ links the silicon atom of the terminal unit to another silicon atom in the polydiorganosiloxane such that the terminal unit is not removed during hardening of the hot melt adhesive composition. Suitable divalent hydrocarbyl groups for $R^{L1}$ are exemplified by an alkylene group such as ethylene, propylene, butylene, or hexylene; an arylene group such as phenylene, or an alkylarylene group such as:

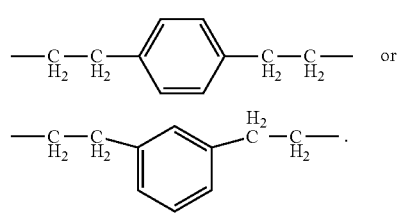

Alternatively, an instance of $R^{L1}$ may be an oxygen atom while a different instance of $R^{L1}$ is a divalent hydrocarbyl group. Alternatively, each $R^{L1}$ may be an oxygen atom. When $R^{L1}$ is a divalent hydrocarbyl group, starting material (B) may comprises a reaction product of a reaction of an alkoxysilane-functional organosiloxane compound having at least one silicon-bonded hydrogen atom and a polyorganosiloxane having an average, per molecule, of at least 2 aliphatically unsaturated organic groups in the presence of a hydrosilylation catalyst.

The hydrolyzable substituents for $X^3$ are exemplified by hydrogen atoms; halogen atoms; amido groups such as acetamido groups, benzamido groups, or methylacetamido groups; acyloxy groups such as acetoxy groups; hydrocarbonoxy groups such as alkoxy groups (e.g., methoxy and ethoxy) or alkenyloxy groups; amino groups; aminoxy groups; hydroxyl groups; mercapto groups; oximo groups; ketoximo groups; alkoxysilylhydrocarbylene groups; or a combination thereof. Alternatively, $X^3$ may be selected from halogen atoms; amido groups such as acetamido groups, benzamido groups, or methylacetamido groups; acyloxy groups such as acetoxy groups; hydrocarbonoxy groups such as alkoxy groups (e.g., methoxy and ethoxy) or alkenyloxy groups; amino groups; aminoxy groups; hydroxyl groups; mercapto groups; alkoxysilylhydrocarbylene groups; or a combination thereof. Alternatively, each X may be a hydroxyl group, a hydrocarbonoxy group, or an alkoxysilylhydrocarbylene group. Alternatively, each $X^3$ may be a hydroxyl group or a methoxy group. Alternatively, each X may be a hydroxyl group. Alternatively, each $X^3$ may be an alkoxysilylhydrocarbylene group.

In one embodiment, the polydiorganosiloxane may have hydrolyzable substituents, i.e., where at least one of subscript kk and subscript mm>0. In this embodiment, the hot melt adhesive composition may be reactive, e.g., condensation reaction curable. Suitable polydiorganosiloxanes having hydrolyzable substituents for starting material (B) are disclosed, for example, in U.S. Pat. No. 8,580,073 at col. 4, line 35 to col. 5, line 56.

In this embodiment, starting material (B) may comprise a polydiorganosiloxane of formula (B1):

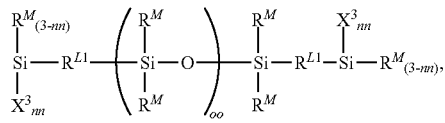

where $R^{L1}$, $R^M$, and $X^3$ are as described above, each subscript nn is independently 1, 2, or 3, and subscript oo is an integer having a value sufficient to provide the polydiorganosiloxane with a zero-shear viscosity of at least 1000 mPa·s at 25° C. and/or a DP of at least 300. DP may be measured by GPC using polystyrene standards calibration. Alternatively, subscript oo may have a value ranging from 100 to 10,000. Such viscosity measurements may be conducted using a rheometer equipped with a cone- and plate geometry, where the zero-shear viscosity is obtained in a regime where viscosity is independent of shear stress and shear rate.

Alternatively, starting material (B) may comprise an α,ω-difunctional-polydiorganosiloxane when, in the formula (B1) above, each subscript nn is 1 and each $R^{L1}$ is an oxygen atom. For example, starting material (B) may have formula (B2): $X^3R^M_2SiO-(R^M_2SiO)_{pp}-SiR^M_2X^3$, where $X^3$ and $R^M$ are as described above and subscript pp is an integer having a value sufficient to give the polydiorganosiloxane of formula (B2) the viscosity described above. Alternatively, subscript pp may have a value ranging from 100 to 10,000, alternatively 150 to 500, and alternatively 300 to 900.

Alternatively, starting material (B) may comprise a hydroxyl-functional polydiorganosiloxane of formula (B2) described above, in which each $X^3$ may be a hydroxyl group, each $R^M$ may be an alkyl group such as methyl, and subscript pp may have a value such that the hydroxyl functional polydiorganosiloxane has a zero-shear viscosity of at least 1000 mPa·s at 25° C. Alternatively, subscript pp may have a value ranging from 300 to 900. Exemplary hydroxyl-endblocked polydiorganosiloxanes are hydroxyl-end-blocked polydimethylsiloxanes. Hydroxyl-endblocked polydiorganosiloxanes suitable for use as starting material (B) may be prepared by methods known in the art, such as hydrolysis and condensation of the corresponding organohalosilanes or equilibration of cyclic polydiorganosiloxanes.

Alternatively, starting material (B) may comprise an alkoxysilylhydrocarbylene-endblocked polydiorganosiloxane, for example, when in formula (B1) above each $R^{L1}$ is divalent hydrocarbyl group or a combination of a divalent hydrocarbyl group and a divalent siloxane group. Alternatively, each $R^M$ may be alkyl, each $R^{L1}$ may be alkylene such as ethylene, and each subscript nn may be 3.

Alkoxysilylhydrocarbylene-endblocked polydiorganosiloxanes may be prepared by reacting a vinyl-terminated, polydimethylsiloxane with (alkoxysilylhydrocarbyl)tetramethyldisiloxane. Examples of such alkoxysilylhydrocarbylene-endblocked polydiorganosiloxanes may be prepared by methods, such as those disclosed in U.S. Pat. No. 3,175,993 to Weyenberg; and U.S. Patent Publication 2015/0376482 at paragraphs [0016] to [0020] and [0045] to [0060] which are hereby incorporated by reference. Alternatively, the polydiorganosiloxane wherein $R^3$ is a divalent hydrocarbon group may be prepared by reacting the polydiorganosiloxane having terminal aliphatically unsaturated groups described above, with an alkoxysilyl-functional organosilicon compound having at least one silicon bonded hydrogen atom at a molecular terminal in the presence of a hydrosilylation reaction catalyst, such as the catalyst described below. Examples of suitable alkoxysilyl-functional organosilicon compounds are exemplified by alkoxy-functional organohydrogensiloxane oligomers of unit formula:

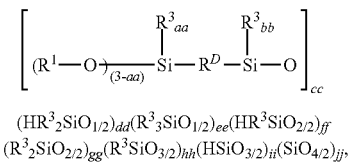

$(HR^3_2SiO_{1/2})_{dd}(R^3_3SiO_{1/2})_{ee}(HR^3SiO_{2/2})_{ff}$
$(R^3_2SiO_{2/2})_{gg}(R^3SiO_{3/2})_{hh}(HSiO_{3/2})_{ii}(SiO_{4/2})_{jj}$, where $R^1$ and $R^3$ and subscripts aa, bb, cc, dd, ee, ff, gg, hh, ii, and jj are as described above. Examples of such alkoxy-functional organohydrogensiloxane oligomers may be prepared by the methods in U.S. Provisional Patent Application Ser. Nos. 62/524,636, 62/524,637, and 62/524,639, all of which were filed on 26 Jun. 2017, corresponding to U.S. Patent Application Publication Numbers US20200140618, US20200231756, and US20200231755, respectively, and all of which are hereby incorporated by reference.

Alternatively, (B) the polydiorganosiloxane may be free of hydrolyzable substituents, when subscript kk=0 and subscript mm=0 in the D units and terminal units described above. In one embodiment, the polydiorganosilxoane may have terminally aliphatically unsaturated groups, e.g., when the hot melt adhesive composition is hydrosilylation reaction curable.

In this embodiment, starting material (B) may comprise a polydiorganosiloxane of

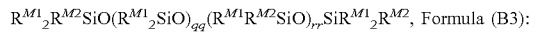

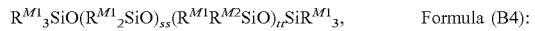

or a combination thereof.

In formulae (B3) and (B4), each $R^{M1}$ is independently a hydrogen atom or a monovalent hydrocarbyl group free of aliphatic unsaturation and each $R^{M2}$ is independently an aliphatically unsaturated hydrocarbyl group. Subscript qq may be 0 or a positive number. Alternatively, subscript qq has an average value of at least 2. Alternatively subscript qq may have a value ranging from 2 to 2000. Subscript rr may be 0 or a positive number. Alternatively, subscript rr may have an average value ranging from 0 to 2000. Subscript ss may be 0 or a positive number. Alternatively, subscript ss may have an average value ranging from 0 to 2000. Subscript tt has an average value of at least 2. Alternatively subscript tt may have an average value ranging from 2 to 2000. Suitable monovalent organic groups for $R^{M1}$ are as described above. Alternatively, in formulae (B3) and (B4) each $R^{M1}$ is a monovalent hydrocarbon group exemplified by alkyl such as methyl and aryl such as phenyl; and each $R^{M2}$ is independently an aliphatically unsaturated monovalent organic group exemplified by alkenyl groups such as vinyl, allyl, butenyl, and hexenyl; and alkynyl groups such as ethynyl and propynyl.

In this embodiment, starting material (B) may comprise a polydiorganosiloxane such as
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylvinylsiloxy-terminated poly(dimethylsiloxane/methylphenylsiloxane),
viii) dimethylvinylsiloxy-terminated poly(dimethylsiloxane/diphenylsiloxane),
ix) phenyl,methyl,vinyl-siloxy-terminated polydimethylsiloxane,
x) dimethylhexenylsiloxy-terminated polydimethylsiloxane,
xi) dimethylhexenylsiloxy-terminated poly(dimethylsiloxane/methylhexenylsiloxane),
xii) dimethylhexenylsiloxy-terminated polymethylhexenylsiloxane,
xiii) trimethylsiloxy-terminated poly(dimethylsiloxane/methylhexenylsiloxane),
xiv) trimethylsiloxy-terminated polymethylhexenylsiloxane
xv) dimethylhexenyl-siloxy terminated poly(dimethylsiloxane/methylhexenylsiloxane),
xvi) dimethylvinylsiloxy-terminated poly(dimethylsiloxane/methylhexenylsiloxane)
xvii) a combination thereof.

Methods of preparing polydiorganosiloxanes suitable for use as starting material (B), such as hydrolysis and condensation of the corresponding organohalosilanes or equilibration of cyclic polydiorganosiloxanes, are well known in the art.

In an alternative embodiment, the polydiorganosiloxane may be have formula (B5): $R^{M3}_3SiO(R^{M3}_2SiO)_{ss}SiR^{M3}_3$, where subscript ss is as described above, and each $R^{M3}$ is an independently selected monovalent hydrocarbyl group free of aliphatic unsaturation. Each $R^{M3}$ may be an alkyl group or an aryl group such as phenyl. Alternatively, each $R^{M3}$ may be an alkyl group such as methyl.

Polydiorganosiloxanes of formula (B5) may be used in a non-reactive hot melt adhesive composition, or added to a reactive hot melt adhesive composition containing one or more additional polydiorganosiloxanes having reactive substituents (e.g., hydrolyzable substituent $X^3$ for a condensation reaction curable hot melt adhesive composition or a polydiorganosiloxane having terminally aliphatically unsaturated hydrocarbyl groups in a hydrosilylation curable hot melt adhesive composition). Examples of polydiorganosiloxanes of formula (B5) include trimethylsiloxy-terminated polydimethylsiloxane and trimethylsiloxy-terminated (dimethyl/methylphenyl)siloxane copolymer.

The amount of starting material (B) in the hot melt adhesive composition depends on various factors including whether any starting materials in addition to (A), (B) and (C) are added and whether the hot melt adhesive composition is reactive. However, starting material (B) the polydiorganosiloxane may be present in the hot melt adhesive composition in an amount of 0% to 35%, based on combined weights of all starting materials in the hot melt adhesive composition; alternatively 5% to 25%, on the same basis.

(C) Polyorganosilicate Resin

The polyorganosilicate resin useful as starting material (C) comprises monofunctional units ("M" units) of formula $R^M_3SiO_{1/2}$ and tetrafunctional silicate units ("Q" units) of formula $SiO_{4/2}$, where each $R^M$ is an independently selected monovalent organic group, as described above for starting material (B). Alternatively, in the polyorganosilicate resin, each $R^M$ may be independently selected from the group consisting of alkyl, alkenyl and aryl. Alternatively, each $R^M$ may be selected from methyl, vinyl and phenyl. Alternatively, at least one-third, alternatively at least two thirds of the $R^M$ groups are methyl groups. Alternatively, the M units may be exemplified by $(Me_3SiO_{1/2})$, $(Me_2PhSiO_{1/2})$, and $(Me_2ViSiO_{1/2})$. The polyorganosilicate resin is soluble in solvents such as those described above, exemplified by liquid hydrocarbons, such as benzene, toluene, xylene, and heptane, or in liquid organosilicon compounds such as low viscosity linear and cyclic polydiorganosiloxanes.

When prepared, the polyorganosilicate resin comprises the M and Q units described above, and the polyorganosiloxane further comprises units with silicon bonded hydroxyl groups and may comprise neopentamer of formula $Si(O-SiRM_3)_4$, where $R^M$ is as described above, e.g., the neopentamer may be tetrakis(trimethylsiloxy)silane. $^{29}Si$ NMR spectroscopy may be used to measure hydroxyl content and molar ratio of M and Q units, where said ratio is expressed as {M(resin)}/{Q(resin)}, excluding M and Q units from the neopentamer. M:Q ratio represents the molar ratio of the total number of triorganosiloxy groups (M units) of the resinous portion of the polyorganosilicate resin to the total number of silicate groups (Q units) in the resinous portion. M:Q ratio may be 0.5:1 to 1.5:1.

The Mn of the polyorganosilicate resin depends on various factors including the types of hydrocarbyl groups represented by $R^M$ that are present. The Mn of the polyorganosilicate resin refers to the number average molecular weight measured using gel permeation chromatography (GPC), when the peak representing the neopentamer is excluded from the measurement. The Mn of the polyorganosilicate resin may be greater than 3,000 Da, alternatively>3,000 Da to 8,000 Da. Alternatively, Mn of the polyorganosilicate resin may be 3,500 Da to 8,000 Da.

U.S. Pat. No. 8,580,073 at col. 3, line 5 to col. 4, line 31, and U.S. Patent Publication 2016/0376482 at paragraphs [0023] to [0026] are hereby incorporated by reference for disclosing MQ resins, which are suitable polyorganosilicate resins for use in the hot melt adhesive composition described herein. The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^M{}_3SiX^1$, where $R^M$ is as described above and $X^1$ represents a hydrolyzable substituent such as that described above for $X^3$. Silanes with four hydrolyzable substituents may have formula $SiX^2{}_4$, where each $X^2$ is halogen, alkoxy or hydroxyl. Suitable alkali metal silicates include sodium silicate.

The polyorganosilicate resin prepared as described above typically contain silicon bonded hydroxyl groups, i.e., of formulae, $HOSi_{3/2}$ and/or $HOR^M{}_2SiO_{1/2}$. The polyorganosilicate resin may comprise up to 2% of silicon bonded hydroxyl groups, as measured by FTIR spectroscopy. For certain applications, it may be desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the polyorganosilicate resin can be converted to trihydrocarbyl siloxane groups or to a different hydrolyzable group by reacting the silicone resin with a silane, disiloxane, or disilazane containing the appropriate terminal group. Silanes containing hydrolyzable groups may be added in molar excess of the quantity required to react with the silicon bonded hydroxyl groups on the polyorganosilicate resin.

In one embodiment, the polyorganosilicate resin may further comprises 2% or less, alternatively 0.7% or less, and alternatively 0.3% or less, and alternatively 0.3% to 0.8% of units represented by formula $XSiO_{3/2}$ and/or $XR^M{}_2SiO_{1/2}$ where $R^M$ is as described above, and X represents a hydrolyzable substituent, as described above for $X^3$. The concentration of silanol groups present in the polyorganosiloxane may be determined using FTIR spectroscopy.

Alternatively, the polyorganosilicate resin may have terminal aliphatically unsaturated groups. The polyorganosilicate resin having terminal aliphatically unsaturated groups may be prepared by reacting the product of Daudt, et al. with an unsaturated organic group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare such resin.

Alternatively, the polyorganosilicate resin may further comprise alkoxy-functional groups. This resin may be prepared by reacting the polyorganosilicate resin having terminal aliphatically unsaturated groups described above, with an alkoxysilyl-functional organosilicon compound having at least one silicon bonded hydrogen atom at a molecular terminal in the presence of a hydrosilylation reaction catalyst, such as the catalyst described below. Examples of suitable alkoxysilyl-functional organosilicon compounds are exemplified by alkoxy-functional organohydrogensiloxane oligomers of unit formula:

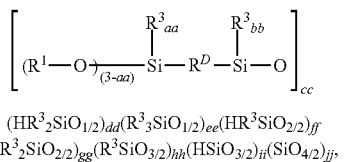

$(HR^3{}_2SiO_{1/2})_{dd}(R^3{}_3SiO_{1/2})_{ee}(HR^3SiO_{2/2})_{ff}$
$(R^3{}_2SiO_{2/2})_{gg}(R^3SiO_{3/2})_{hh}(HSiO_{3/2})_{ii}(SiO_{4/2})_{jj}$, where $R^1$ and $R^3$ and subscripts aa, bb, cc, dd, ee, ff, gg, hh, ii, and jj are as described above. Examples of such alkoxy-functional organohydrogensiloxane oligomers may be prepared by the methods in co-pending U.S. Provisional Patent Application Ser. Nos. 62/524,636, 62/524,637, and 62/524,639, all of which were filed on 26 Jun. 2017, corresponding to U.S. Patent Application Publication Numbers US20200140618, US20200231756, and US20200231755, respectively, and all of which are hereby incorporated by reference. Examples of polyalkoxysilyl-functional polyorganosilicate resins and methods for their preparation are disclosed, for example, in U.S. Pat. No. 9,862,867 to Gordon, et al. and U.S. Patent Publication 2015/0376482 to Bekemeier, et al., at paragraphs [0011] to [0016] and [0021] to [0044], which are hereby incorporated by reference. The resulting polyalkoxysilyl-functional polyorganosilicate resin may be an MQ or MDQ resin.

The amount of starting material (C) in the hot melt adhesive composition depends on various factors including whether any starting materials in addition to (A), (B) and (C) are added and whether the hot melt adhesive composition is reactive. However, starting material (C) the polyorganosilicate resin may be present in the hot melt adhesive composition in an amount sufficient to provide a weight ratio of (C) polyorganosilicate resin to polydiorganosiloxane (Resin/Polymer, ratio) of 50/50 to 70/30, alternatively 55/45 to 65/35. The amount of polydiorganosiloxane accounted for in the Resin/Polymer ratio includes (B) the polydiorganosiloxane and the polydiorganosiloxane blocks of starting material (A).

(D) Catalyst

The catalyst may be any catalyst capable of catalyzing reactive substituents on other starting materials when the hot melt adhesive composition is reactive. When the hot melt adhesive composition is reactive via hydrosilylation reaction, the catalyst is a hydrosilylation reaction catalyst. When the hot melt adhesive composition is reactive via condensation reaction, the catalyst is a condensation reaction catalyst. In a dual cure hot melt adhesive composition, both a hydrosilylation reaction catalyst and a condensation reaction catalyst may be added to the hot melt adhesive composition.

Hydrosilylation reaction catalysts include platinum group metal catalysts, which are known in the art and are commercially available. Such hydrosilylation catalysts can be a metal selected from platinum, rhodium, ruthenium, palladium, osmium, and iridium. Alternatively, the hydrosilylation catalyst may be a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and complexes of the compounds with low molecular weight organopolysiloxanes or platinum group metal compounds microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst). These complexes may be microencapsulated in a resin matrix. Alternatively, a hydrosilylation catalyst may comprise 1,3-diethenyl-1,1,3,3-tetramethyldisiloxane complex with platinum. Exemplary hydrosilylation catalysts are described in U.S. Pat. Nos. 3,159,601; 3,220,972; 3,296,291; 3,419,593; 3,516,946; 3,814,730; 3,989,668; 4,766,176; 4,784,879; 5,017,654; 5,036,117; and 5,175,325 and EP 0 347 895 B.

The amount of catalyst used in the hydrosilylation reactive hot melt adhesive composition will depend on various factors including the selection of starting materials (A), (B), and (C) and their respective contents of silicon bonded hydrogen atoms and terminally aliphatically unsaturated groups, whether an inhibitor, is present, and the temperature during processing. However, the amount of catalyst is sufficient to catalyze hydrosilylation reaction of the reactive substituents in the starting materials, alternatively the amount of catalyst is sufficient to provide 1 ppm to 1000 ppm of the platinum group metal based on combined weights of all starting materials in the hot melt adhesive composition, alternatively 5 ppm to 100 ppm, on the same basis.

Condensation reaction catalysts include tin and titanium compounds, which are known in the art and are commercially available. Organotin compounds for condensation reaction catalysis are those where the valence of the tin is either +4 or +2, i.e., Tin (IV) compounds or Tin (II) compounds. Examples of tin (IV) compounds include stannic salts of carboxylic acids such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin trisuberate, dibutyl tin dioctanoate, dibutyl tin diformate, isobutyl tin triceroate, dimethyl tin dibutyrate, dimethyl tin di-neodeconoate, dibutyl tin di-neodeconoate, triethyl tin tartrate, dibutyl tin dibenzoate, butyltintri-2-ethylhexanoate, dioctyl tin diacetate, tin octylate, tin oleate, tin butyrate, tin naphthenate, dimethyl tin dichloride, a combination thereof, and/or a partial hydrolysis product thereof. Tin (IV) compounds are known in the art and are commercially available, such as Metatin™ 740 and Fascat™ 4202 from Acima Specialty Chemicals of Switzerland, Europe, which is a business unit of The Dow Chemical Company. Examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthanate, stannous hexanoate, stannous succinate, stannous caprylate, and a combination thereof. Organotitanium compounds such as tetrabutyl titanate and 2,5-di-isopropoxy-bis(ethylacetate)titanium; and partially chelated derivatives of these salts with chelating agents such as acetoacetic acid esters and beta-diketones may alternatively be used as the condensation reaction catalyst.

The amount of catalyst used in the condensation reactive hot melt adhesive composition will depend on various factors including the selection of starting materials (A), (B), and (C) and their respective types and contents of hydrolyzable substituents, whether a crosslinker, is present, and the temperature during processing, however, the amount of catalyst is sufficient to catalyze condensation reaction of the reactive substituents in the starting materials, alternatively the amount of catalyst may be 0.01% to 3% based on combined weights of starting materials (A), (B), and (C). Alternatively, the amount of catalyst may be 0.05% to 1% on the same basis.

(E) Crosslinker

Starting material (E) is a crosslinker, which may be added to the hot melt adhesive composition when it is reactive. The selection of crosslinker depends on the type of reactivity, e.g., hydrosilylation or condensation, or dual cure.

In one embodiment, e.g., when the hot melt adhesive composition is hydrosilylation reactive, the crosslinker may be a silyl compound having at least three silicon bonded hydrogen atoms per molecule. In this embodiment, starting material (E) may be a SiH functional organosilicon compound, i.e., a compound having an average, per molecule, of one or more silicon bonded hydrogen atoms. This crosslinker may comprise a silane and/or an organohydrogensilicon compound. Alternatively, this crosslinker may have an average, per molecule, of at least two silicon-bonded hydrogen atoms. The amount of crosslinker in the hydrosilylation reactive hot melt adhesive composition depends on various factors including the SiH content of the crosslinker, the unsaturated group content of starting materials (A), (B), and (C), however, the amount of crosslinker may be sufficient to provide a molar ratio of SiH groups in the hot melt adhesive composition to terminally aliphatically unsaturated organic groups in the hot melt adhesive composition (commonly referred to as the total SiH:Vi ratio) ranging from 0.3:1 to 5:1, alternatively 0.1:10 to 10:1. The crosslinker can have a monomeric or polymeric structure. When the crosslinker has a polymeric structure, the polymeric structure may be a linear, branched, cyclic, or resinous structure. When the crosslinker is polymeric, then the crosslinker can be a homopolymer or a copolymer. The silicon-bonded hydrogen atoms in the crosslinker can be located at terminal, pendant, or at both terminal and pendant positions. The crosslinker may be one SiH functional compound. Alternatively, the crosslinker may comprise a combination of two or more SiH functional compounds. The crosslinker may be two or more organohydrogenpolysiloxanes that differ in at least one of the following properties: structure, average molecular weight, viscosity, siloxane units, and sequence.

The crosslinker may comprise a silane of formula $R^{M4}_{uu}SiH_{vv}$, where subscript uu is 0, 1, 2, or 3; subscript vv is 1, 2, 3, or 4, with the proviso that a quantity (uu+vv)=4. Each $R^{M4}$ is independently a halogen atom or a monovalent hydrocarbyl group, such as the monovalent hydrocarbyl groups described above for $R^M$. Suitable halogen atoms for $R^{M4}$ are exemplified by chlorine, fluorine, bromine, and iodine; alternatively chlorine. Examples of suitable silanes for the crosslinker are exemplified by trichlorosilane ($HSiCl_3$) and $Me_2HSiCl$.

Alternatively, the organohydrogensilicon compound for the crosslinker may comprise a polyorganohydrogensiloxane comprising siloxane units including, but not limited to, $HR^{M5}{}_2SiO_{1/2}$, $R^{M5}{}_3SiO_{1/2}$, $HR^{M5}SiO_{2/2}$, $R^{M5}{}_2SiO_{2/2}$, $R^{M5}SiO_{3/2}$, $HSiO_{3/2}$ and $SiO_{4/2}$ units. In the preceding formulae, each $R^{M5}$ is independently selected from the monovalent hydrocarbyl groups free of terminal aliphatic unsaturation described above.

The crosslinker may comprise a polyorganohydrogensiloxane of

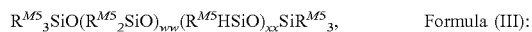  Formula (III):

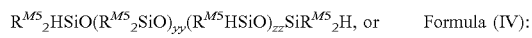  Formula (IV):

a combination thereof.

In formulae (III) and (IV) above, subscript ww has an average value ranging from 0 to 2000, subscript xx has an average value ranging from 2 to 2000, subscript yy has an average value ranging from 0 to 2000, and subscript zz has an average value ranging from 0 to 2000. Each $R^{M5}$ is independently a monovalent organic group, as described above.

Polyorganohydrogensiloxanes for the crosslinker are exemplified by:
a) dimethylhydrogensiloxy-terminated polydimethylsiloxane,
b) dimethylhydrogensiloxy-terminated poly(dimethylsiloxane/methylhydrogensiloxane),
c) dimethylhydrogensiloxy-terminated polymethylhydrogensiloxane,
d) trimethylsiloxy-terminated poly(dimethylsiloxane/methylhydrogensiloxane),
e) trimethylsiloxy-terminated polymethylhydrogensiloxane,
f) a resin consisting essentially of $H(CH_3)_2SiO_{1/2}$ units and $SiO_{4/2}$ units, and
g) a combination thereof.

Methods of preparing linear, branched, and cyclic organohydrogenpolysiloxanes suitable for use as the crosslinker, such as hydrolysis and condensation of organohalosilanes, are well known in the art. Methods of preparing organohydrogenpolysiloxane resins suitable for use as the crosslinker are also well known as exemplified in U.S. Pat. Nos. 5,310,843; 4,370,358; and 4,707,531.

Alternatively, the organohydrogensilicon compound may comprise a cyclic organohydrogensilicon compound. Such organohydrogensilicon compounds are commercially available and include, SYL-OFF™ SL2 CROSSLINKER and SYL-OFF™ SL12 CROSSLINKER, both of which are commercially available from Dow Silicones Corporation of Midland, Mich., U.S.A. The organohydrogensilicon compounds described above and methods for their preparation are exemplified in WO2003/093349 and WO2003/093369.

In this embodiment, the exact amount of crosslinker in the hot melt adhesive composition will depend on various factors including type and amount of starting materials (A), (B), and (C), and the type and amount of any additional starting materials, if present. However, the amount of crosslinker in the hot melt adhesive composition may be 0% to 25%, alternatively 0.1% to 15%, and alternatively 1% to 5%, based on combined weights of all starting materials in the hot melt adhesive composition.

When the hot melt adhesive composition is condensation reactive, the crosslinker may be a silyl compound having at least two hydrolyzable substituents per molecule. In this embodiment, the crosslinker may be a silane represented by monomers of the formula: $R^{M6}{}_{(4-A)}SiX^4{}_A$ and oligomeric reaction products thereof; where $R^{M6}$ is a monovalent organic group, such as the monovalent hydrocarbyl groups and monovalent halogenated hydrocarbyl groups described above for $R^3$, such as alkyl groups having 1 to 6 carbon atoms. $X^4$ in the above formula is a hydrolyzable substituent, as described above for $X^3$. Alternatively, $X^4$ may be selected from alkoxy groups having 1 to 4 carbon atoms, ketoxime groups, aminoxy groups, acetamido groups, N-methylacetamido groups, or acetoxy groups and subscript A is 2 to 4, alternatively 3 to 4. The ketoxime groups are of the general formula $—ONC(R^{M6})_2$, in which each $R^{M6}$ independently represents an alkyl group of 1 to 6 carbon atoms or a phenyl group.

Specific examples of silanes suitable as the crosslinker in the condensation reactive hot melt adhesive composition include, but are not limited to, methyltriethoxysilane, ethyltrimethoxysilane, propyltrimethoxysilane, tetramethoxysilane tetraethoxysilane, phenyltrimethoxysilane, isobutyltrimethoxysilane, and 3-mercaptopropyltrimethoxysilane, (1,6-bis(trimethoxysilyl)hexane)glycidoxypropyltrimethoxysilane, am inoethylaminopropyltrimethoxysilane, methyltriacetoxysilane, ethyltriacetoxysilane, tetra(methylethyl ketoximo)silane, methyl-tris(methylethylketoximo)silane and vinyl-tris(methylethylketoximo)silane, and combinations thereof.

In this embodiment, the crosslinker may be added to the condensation reactive hot melt adhesive composition in an amount of 0.01% to 10%, alternatively 0.3% to 5%, based on combined weights of starting materials (A), (B), and (C). This silane may be added for several purposes including, but not limited to, to provide stability to the compositions as a moisture scavenger, to aid with network formation, and to act as an adhesion promoter.

(F) Inhibitor

Starting material (F) an inhibitor may be added to the hot melt adhesive composition, for example, when it is reactive via hydrosilylation reaction, for altering the reaction rate of the starting materials, as compared to a hot melt adhesive composition containing the same starting materials but with the inhibitor omitted. Inhibitors for hydrosilylation reactions are exemplified by (F1) acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination of two or more thereof; (F2) cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination of two or more thereof; (F3) ene-yne compounds such as 3-methyl-3-penten-1-yne, 3,5-dimethyl-3-hexen-1-yne, and a combination of two or more thereof; (E4) triazoles such as benzotriazole; (F5) phosphines; (F6) mercaptans; (F7) hydrazines; (F8) amines, such as tetramethyl ethylenediamine; (F9) fumarates such as dialkyl fumarates, dialkenyl fumarates, dialkoxyalkyl fumarates, and a combination of two or more thereof; (F10) maleates such as diallyl maleate; (F11) nitriles; (F23) ethers; (F13) carbon monoxide; (F14) alcohols such as benzyl alcohol; (F15) a silylated acetylenic compound; and a combination of two or more of (F1) to (F15).

The silylated acetylenic compound may be used to reduce or minimize coloring (yellowing) of the reaction product produced in step 1), as compared to a reaction product that does not contain a silylated acetylenic compound or that contains an organic acetylenic alcohol, such as those described above. The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the inhibitor is exemplified by methyl(tris(1,1-dimethyl-2-propynyloxy))silane, ((1,1-dimethyl-2-propynyl)oxy)trimethylsilane, or a combination thereof. The silylated acetylenic compound useful as inhibitor may be prepared by methods known in the art, such as silylating an acetylenic alcohol described above by reacting it with a chlorosilane in the presence of an acid receptor.

The amount of inhibitor added to the melt adhesive composition will depend on various factors including the desired pot life of the composition, the temperature selected for processing and dispensing, the particular inhibitor used, and the selection and amounts other starting materials used. However, when present, the amount of inhibitor may range from >0% to 1%, alternatively >0% to 5%, alternatively 0.001% to 1%, alternatively 0.01% to 0.5%, and alternatively 0.0025% to 0.025%, based on combined weights of all starting materials in the hot melt adhesive composition.

(G) Vehicle

A vehicle (e.g., a solvent and/or diluent) may optionally be added to the hot melt adhesive composition. The vehicle may facilitate flow of the hot melt adhesive composition and introduction of certain starting materials, such as the polyorganosilicate resin and/or the vehicle may act as a rheological aid in the hot melt adhesive composition. Vehicles used herein are those that help fluidize the starting materials used in the hot melt adhesive composition but essentially do not react with any of these starting materials. The vehicle may be selected based on solubility the starting materials in the hot melt adhesive composition and volatility. The solubility refers to the vehicle being sufficient to dissolve and/or disperse starting materials of the hot melt adhesive composition. Volatility refers to vapor pressure of the vehicle. If the vehicle is not volatile enough (too low vapor pressure) the vehicle may remain as a plasticizer in the hot melt adhesive, or the amount of time for the reactive hot melt adhesive to develop physical properties may be longer than desired.

Suitable vehicles include polyorganosiloxanes with suitable vapor pressures, such as hexamethyldisiloxane, octamethyltrisiloxane, hexamethylcyclotrisiloxane, and other low molecular weight polyorganosiloxanes, such as 0.65 to 1.5 centiStoke (cSt) DOWSIL™ 200 Fluids and DOWSIL™ OS FLUIDS, which are commercially available from Dow Silicones Corporation of Midland, Mich., U.S.A.

Alternatively, the vehicle may be an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride; chloroform; dimethyl sulfoxide; dimethyl formamide, acetonitrile; tetrahydrofuran; white spirits; mineral spirits; naphtha; n-methyl pyrrolidone; or a combination thereof.

The amount of vehicle can depend on various factors including the type of vehicle selected and the amount and type of other starting materials selected for the hot melt adhesive composition. However, the amount of vehicle may range from 1% to 99%, alternatively 2% to 50%, based on combined weights of all starting materials in the composition. Starting material (G) may be one vehicle. Alternatively, starting material (G) may comprise two or more different vehicles.

(H) Moisture Scavenger

Ingredient (H) is a moisture scavenger that may optionally be added to the hot melt adhesive composition. The moisture scavenger may be added to bind water from various sources that may reduce the shelf life of the hot melt adhesive composition. For example, when the hot melt adhesive composition is condensation reactive, the moisture scavenger may bind by-products of the condensation reaction, such as water and/or alcohols.

Examples of suitable adsorbents for the moisture scavenger may be inorganic particulates. The adsorbent may have a particle size of 10 micrometers or less, alternatively 5 micrometers or less. The adsorbent may have average pore size sufficient to adsorb water and alcohols, for example 10 Å (Angstroms) or less, alternatively 5 Å or less, and alternatively 3 Å or less. Examples of adsorbents include zeolites such as chabasite, mordenite, and analcite; molecular sieves such as alkali metal alumino silicates, silica gel, silica-magnesia gel, activated carbon, activated alumina, calcium oxide, and combinations thereof.

Examples of commercially available moisture scavengers include dry molecular sieves, such as 3 Å (Angstrom) molecular sieves, which are commercially available from Grace Davidson under the trademark SYLOSIV™ and from Zeochem of Louisville, Ky., U.S.A. under the trade name PURMOL, and 4 Å molecular sieves such as Doucil zeolite 4A available from Ineos Silicas of Warrington, England. Other useful molecular sieves include MOLSIV ADSORBENT TYPE 13X, 3A, 4A, and 5A, all of which are commercially available from UOP of Illinois, U.S.A.; SILIPORITE NK 30AP and 65×P from Arkema of King of Prussia, Pa., U.S.A.; and molecular sieves available from W.R. Grace of Maryland, U.S.A.

Alternatively, the moisture scavenger may bind the water and/or other by-products by chemical means. An amount of a silane crosslinker added to the composition (in addition to any amount added as (E) the crosslinker) may function as a chemical moisture scavenger. Without wishing to be bound by theory, it is thought that the chemical moisture scavenger may be added to the dry part of a multiple part composition to keep the composition free from water after the parts of the composition are mixed together. For example, alkoxysilanes suitable as moisture scavengers have boiling points above 150° C. to withstand the process temperatures to manufacture the hot melt adhesive composition and include phenyltrimethoxysilane, tetraethoxysilane, isobutyltrimethoxysilane, vinyltriethoxysilane, and combinations thereof.

The amount of moisture scavenger depends on the specific moisture scavenger selected. However, when the moisture scavenger is a chemical moisture scavenger, the amount may range from 0% to 5%, alternatively 0.1% to 1% based on combined weights of all starting materials in the composition.

(I) Filler

Ingredient (I) is a filler. The filler may comprise an inorganic filler such as fume silica, silica aerogel, silica xerogel, or precipitated silica, pyrogenic silica, diatomaceous silica, ground quartz, crushed quartz, aluminum silicates, mixed aluminum and magnesium silicates, zirconium silicate, mica powder, calcium carbonate such as precipitated calcium carbonate or ground calcium carbonate, glass powder and fibers, titanium oxides of the pyrogenic oxide and rutile type, barium zirconate, barium sulphate, barium metaborate, boron nitride, lithopone, the oxides of iron, zinc, chrome, zirconium, and magnesium, the different forms of alumina (hydrated or anhydrous), graphite, talc, diatomaceous earth, chalk sand, carbon black, and clays such as calcined clay and organic materials such as the phthalocyanines, cork powder, sawdust, synthetic fibers and synthetic polymers (polytetrafluoroethylene, polyethylene, polypropylene, polystyrene and polyvinyl chloride). Fillers are known in the art and are commercially available. For example, fumed silicas are known in the art and commercially available; e.g., fumed silica sold under the name CAB-O-SIL by Cabot Corporation of Massachusetts, U.S.A. Ground silica is sold under the name MIN-U-SIL by U.S. Silica of Berkeley Springs, W. Va. Suitable precipitated calcium carbonates included Winnofil™ SPM from Solvay S.A. of Brussels, Belgium and Ultra-Pflex™ and Ultra-Pflex™ 100 from Specialty Minerals Inc. of New York, U.S.A. The filler may be added in an amount up to 30%, alternatively 5% to 15% based on combined weights of all starting materials in the hot melt adhesive composition.

The filler may optionally be treated with a filler treating agent. The amount of filler treating agent can vary depending on factors such as the type of treating agent selected and the type and amount of particulates to be treated, and whether the particulates are treated before being added to the composition, or whether the particulates are treated in situ. However, the filler treating agent may be used in an amount of 0.01% to 20%, alternatively 0.1% to 15%, and alternatively 0.5% to 5%, based on combined weights of all starting materials in the hot melt adhesive composition. Particulates, such as the filler, the physical moisture scavenger, and/or certain colorants, when present, may optionally be surface treated with the filler treating agent. Particulates may be treated with the filler treating agent before being added to the hot melt adhesive composition, or in situ. The filler treating agent may comprise an alkoxysilane, an alkoxy-functional oligosiloxane, a cyclic polyorganosiloxane, a hydroxyl-functional oligosiloxane such as a dimethyl siloxane or methyl phenyl siloxane, or a fatty acid. Examples of fatty acids include stearates such as calcium stearate.

Some representative organosilicon filler treating agents that can be used include compositions normally used to treat silica fillers such as organochlorosilanes, organosiloxanes, organodisilazanes such as hexaalkyl disilazane, and organoalkoxysilanes such as $C_6H_{13}Si(OCH_3)_3$, $C_8H_{17}Si(OC_2H_5)_3$, $C_{10}H_{21}Si(OCH_3)_3$, $C_{12}H_{25}Si(OCH_3)_3$, $C_{14}H_{29}Si(OC_2H_5)_3$, and $C_6H_5CH_2CH_2Si(OCH_3)_3$. Other treating agents that can be used include alkylthiols, fatty acids, titanates, titanate coupling agents, zirconate coupling agents, and combinations thereof.

Alternatively, the filler treating agent may comprise an alkoxysilane having the formula: $R^{M7}_B Si(OR^{M8})_{(4-B)}$, where subscript B may have a value of 1 to 3, alternatively subscript B=3. Each $R^{M7}$ is independently a monovalent organic group, such as a monovalent hydrocarbyl group of 1 to 50 carbon atoms, alternatively 8 to 30 carbon atoms, alternatively 8 to 18 carbon atoms. $R^{M7}$ is exemplified by alkyl groups such as hexyl, octyl, dodecyl, tetradecyl, hexadecyl, and octadecyl (including branched and linear isomers of each); and aromatic groups such as benzyl and phenylethyl. $R^{M7}$ may be saturated or unsaturated, and branched or unbranched. Alternatively, $R^{M7}$ may be saturated and unbranched.

Each $R^{M8}$ is independently a saturated hydrocarbon group of 1 to 4 carbon atoms, alternatively 1 to 2 carbon atoms. The filler treating agent is exemplified by hexyltrimethoxysilane, octyltriethoxysilane, decyltrimethoxysilane, dodecyltrimethoxysilane, tetradecyltrimethoxysilane, phenylethyltrimethoxysilane, octadecyltrimethoxysilane, octadecyltriethoxysilane, and combinations thereof.

Alkoxy-functional oligosiloxanes may also be used as filler treating agents. For example, suitable alkoxy-functional oligosiloxanes include those of the formula $(R^{M9}O)_C Si(OSiR^{M10}_2 R^{M11})_{(4-C)}$. In this formula, subscript C is 1, 2 or 3, alternatively subscript C=3. Each $R^{M9}$ may be an alkyl group. Each $R^{M10}$ may be an unsaturated monovalent hydrocarbon group of 1 to 10 carbon atoms. Each $R^{M11}$ may be an unsaturated monovalent hydrocarbon group having at least 10 carbon atoms.

(J) Colorant

Starting material (J) is a colorant (e.g., dye and/or pigment) that may optionally be added to the hot melt adhesive composition. Examples of suitable colorants include indigo, titanium dioxide, Stan-Tone 505P01 Green or Stan-Tone 40SP03 Blue (which are commercially available from PolyOne) and carbon black. Representative, non-limiting examples of carbon black include Shawinigan Acetylene black, which is commercially available from Chevron Phillips Chemical Company LP; SUPERJET™ Carbon Black (LB-1011) supplied by Elementis Pigments Inc., of Fairview Heights, Ill. U.S.A.; SR 511 supplied by Sid Richardson Carbon Co, of Akron, Ohio U.S.A.; Colorant BA 33 Iron Oxide colorant (which is commercially available from Cathay Pigments (USA), Inc. Valparaiso, Ind. 46383 USA); and N330, N550, N762, N990 (from Degussa Engineered Carbons of Parsippany, N.J., U.S.A.). Examples of colorants are known in the art and are disclosed in U.S. Pat. Nos. 4,962,076; 5,051,455; and 5,053,442; and U.S. Patent Publication 2015/0376482 at paragraph [0070], which is hereby incorporated by reference.

The amount of colorant depends on various factors including the type of colorant selected and the desired degree of coloration of the hot melt adhesive and the selection of starting materials in the hot melt adhesive composition. For example, the hot melt adhesive composition may comprise 0 to 10%, alternatively 0.001% to 5%, of a colorant based combined weights of all starting materials in the hot melt adhesive composition.

(K) Fluorescent Brightener

Starting material (K) is a fluorescent brightener that can be added to the hot melt adhesive composition, for example to aid in ensuring good dispensing when the hot melt adhesive composition is dispensed onto a substrate. The fluorescent brightener may be any chemical compound that absorbs light in the ultraviolet and violet region (usually 340-370 nm) of the electromagnetic spectrum, re-emits light in the blue region (typically 420-470 nm) by fluorescence, and exhibits excellent heat resistance. Exemplary fluorescent brighteners include stilbenes, e.g., 4,4'-diamino-2,2'-stilbenedisulfonic acid, coumarins, imidazolines, diazoles, triazoles, and benzoxazolines. Fluorescent brighteners are commercially available, such as 2,5-thiophenediylbis(5-tert-butyl-1,3-benzoxazole) which is commercially available as TINOPAL™ OB from BASF Corporation of Southfield, Mich., U.S.A. When present, the amount of fluorescent brightener may be 1 ppm to 1%, alternatively 0.01% to 0.05%, based on combined weights of all starting materials in the hot melt adhesive composition.

(L) Corrosion Inhibitor

Starting material (L) is a corrosion inhibitor that may optionally be added to the hot melt adhesive composition. Examples of suitable corrosion inhibitors include benzotriazole, mercaptabenzotriazole, mercaptobenzothiazole, and commercially available corrosion inhibitors such as 2,5-dimercapto-1,3,4-thiadiazole derivative (CUVAN™ 826) and alkylthiadiazole (CUVAN™ 484) from R. T. Vanderbilt of Norwalk, Conn., U.S.A. When present, the amount of corrosion inhibitor may be 0.05% to 0.5% based on combined weights of all starting materials in the hot melt adhesive composition.

(M) Anti-Aging Additive

Starting material (M) is an anti-aging additive that may optionally be added to the hot melt adhesive composition. The anti-aging additive may comprise (M1) an antioxidant, (M2) a UV absorber, (M3) a UV stabilizer, (M4) a heat stabilizer, or a combination of two or more of (M1), (M2), (M3) and (M4). Suitable antioxidants are known in the art and are commercially available. Suitable antioxidants include phenolic antioxidants and combinations of phenolic antioxidants with stabilizers. Phenolic antioxidants include fully sterically hindered phenols and partially hindered phenols. Alternatively, the stabilizer may be a sterically hindered amine such as tetramethyl-piperidine derivatives. Suitable phenolic antioxidants include vitamin E and IRGANOX™ 1010 from Ciba Specialty Chemicals, U.S.A. IRGANOX™ 1010 comprises pentaerythritol tetrakis(3-(3, 5-di-t-butyl-4-hydroxyphenyl)propionate). Examples of UV absorbers include phenol, 2-(2H-benzotriazol-2-yl)-6-dodecyl-4-methyl-, branched and linear (TINUVIN™ 571). Examples of UV stabilizers include bis(1,2,2,6,6-pentamethyl-4-piperidyl) sebacate; methyl 1,2,2,6,6-pentamethyl-4-piperidyl/sebacate; and a combination thereof (TINUVIN™ 272). These and other TINUVIN™ additives, such as TINUVIN™ 765 are commercially available from Ciba Specialty Chemicals of Tarrytown, N.Y., U.S.A. Other UV and light stabilizers are commercially available, and are exemplified by LowLite from Chemtura, OnCap from PolyOne, and Light Stabilizer 210 from E. I. du Pont de Nemours and Company of Delaware, U.S.A. Oligomeric (higher molecular weight) stabilizers may alternatively be used, for example, to minimize potential for migration of the stabilizer out of the composition or the cured product thereof. An example of an oligomeric antioxidant stabilizer (specifically, hindered amine light stabilizer (HALS)) is Ciba TINUVIN™ 622, which is a dimethylester of butanedioic acid copolymerized with 4-hydroxy-2,2,6,6-tetramethyl-1-piperidine ethanol. Heat stabilizers may include metal salts of Ce, Cu, Zr, Mg, Fe, or Zn, such as iron oxides, carbon blacks, iron carboxylate salts, cerium hydrate, barium zirconate, cerium and zirconium octoates, and porphyrins. The amount of anti-aging additive depends on various factors including the specific anti-aging additive selected and the anti-aging benefit desired. However, the amount of anti-aging additive may be 0 to 5%, alternatively 0.001% to 1%, alternatively 0.1% to 4%, and alternatively 0.5% to 3%, based on combined weights of all starting materials in the hot melt adhesive composition.

When selecting starting materials for the hot melt adhesive composition described above, there may be overlap between types of starting materials because certain starting materials described herein may have more than one function. For example, certain alkoxysilanes may be useful as filler treating agents and as adhesion promoters in any hot melt adhesive composition; alternatively, said alkoxysilanes may also be useful as moisture scavengers and/or crosslinkers in condensation reactive hot melt adhesive compositions. Carbon black may be useful as a colorant, and/or a filler.

In one embodiment, the hot melt adhesive composition may be prepared by adding (A) the polyolefin-polydiorganosiloxane block copolymer described above to a moisture curable hot melt adhesive composition, as described in U.S. Patent Publication 2015/0376482 to Bekemeier, et al. The polyolefin-polydiorganosiloxane block copolymer may be in an amount of at least 0.5%, alternatively 0.5% to 20%, based on combined weights of all starting materials in the hot melt adhesive composition.

Method for Making the Hot Melt Adhesive Composition

The hot melt adhesive composition may be prepared by a method comprising combining starting materials (A), (B), and (C), and optionally one or more of additional starting materials (D), (E), (F), (G), (H), (I), (J), (K), (L), and (M). Combining may be performed by any convenient means such as feeding the starting materials through an extrusion device to mix the starting materials; optionally remove volatiles, e.g., if a vehicle is present; and recover the hot melt adhesive composition. The hot melt adhesive composition may have a nonvolatile content of 97.5% to 100%, alternatively 98.5% to 100%, and alternatively 99% to 100%.

The vehicle described above may be used in preparing the hot melt adhesive composition. For example, one or more starting materials, such as the polyorganosilicate resin may be dissolved or dispersed in the vehicle. The vehicle aids with the flow and introduction of the starting materials. However, some or all of the vehicle may be removed in a continuous process for producing the hot melt adhesive composition. In one embodiment, the hot melt adhesive prepared by hardening the hot melt adhesive composition contains 0% to 2.5%, alternatively 0% to 0.5% of vehicle.

Typically, to prepare a hot melt adhesive composition, starting materials comprising (A), (B), and (C) and any additional starting materials are fed into a continuous mixing device. The order of addition into the devices is not critical to produce the hot melt adhesive composition. If the hot melt adhesive composition is condensation reactive and the polyorganosilicate resin has greater than 0.7% silanol, it may be desirable to add any silane crosslinker and catalyst that may be used together with the polyorganosilicate resin to allow for any reaction to take place and any volatile reaction by-products (e.g., water or alcohols) to be removed. The continuous mixing device should be capable of mixing the starting materials and should include means for removing volatiles, such as the by-products described above and the vehicle. Typically an extrusion device is used, such as a devolatilizing twin screw extruder. When using an extrusion device, the starting materials are fed into the extruder and may be heated at a temperature of 50° C. to 250° C., alternatively 110° C. to 190° C. Heating the starting materials also lowers the viscosity to facilitate mixing. In one embodiment, starting materials (A) the polyolefin-polydiorganosiloxane block copolymer, (B) polydiorganosiloxane, (C) polyorganosilicate resin, and (G) vehicle are fed into the extrusion device first. When the hot melt adhesive composition is reactive, catalyst and crosslinker may be added concurrently, or at a later point in the process. When a hydrosilylation reactive hot melt adhesive composition is being prepared, inhibitor may be added before the catalyst.

Vacuum may be applied in single or multiple stages on the continuous mixing device (e.g., devolatilizing extruder). Use of multiple vacuum stages may be beneficial to remove the vehicle. Because certain starting materials, such as the crosslinker, may be volatile, any volatile starting material may be added after some or all of the solvent has been removed to prevent removal of volatile starting materials with the solvent. One skilled in the art would be able to prepare a hot melt adhesive composition from the starting materials described herein using, for example, the processing techniques described in U.S. Pat. No. 8,580,073 at col. 7, line 28 to col. 8, line 24, U.S. Patent Publication 2008/0300358, or U.S. Patent Publication 2015/0376482.

Method of Use/Application

The hot melt adhesive composition described herein can be used in an assembly process, comprising: 1) dispensing a melted hot melt adhesive composition on a substrate, 2) assembling the substrate with the silicone hot melt adhesive composition and one or more additional substrates after step 1) and concurrently with step 3), and 3) cooling the hot melt adhesive composition. The hot melt adhesive composition solidifies to an adhesive and/or sealant as it cools. The assembly process may optionally further comprise: 4) curing the hot melt adhesive composition during and/or after step 3). The hot melt adhesive composition and process described herein are useful for electronic device assembly. Hot melt dispensing may be by any convenient means, such as controlled-and-timed compressed air, positive displacement, jetting, and any others known in the art.

The substrate (and any additional substrates) may be any component of an electronic device. The substrate may comprise a material of construction selected from the group consisting of glass, plastic, silicone elastomers, metal, and combinations thereof. Exemplary plastics include glass-filled polycarbonate, fiberglass, polytetrafluoroethylene, and polyvinyl chloride. Exemplary metal substrates include aluminium, magnesium, and stainless steel.

EXAMPLES

These examples are intended to illustrate some embodiments of the invention and should not be interpreted as limiting the scope of the invention set forth in the claims. Reference Examples are not to be deemed to be prior art unless otherwise indicated.

Reference Example A

Procedure for Silylation of Di-Polyethylene-Zinc with Dimethylhydrogenchlorosilane (HMe$_2$SiCl)

Di-polyethylene-zinc and Isopar (Mw=1580 Da, 10 mM) were placed in a vial. The vial was heated at 120° C. until the contents became clear and homogeneous. Dimethylhydrogenchlorosilane and NMI were added to the vial. The vial was heated at 90° C. for 3 hours. Iodine (I$_2$) was then added to quench unreacted di-polyethylene zinc. The resulting product was evaluated by $^1$H NMR. The molar equivalents of HMe$_2$SiCl and conversion to product results are shown below.

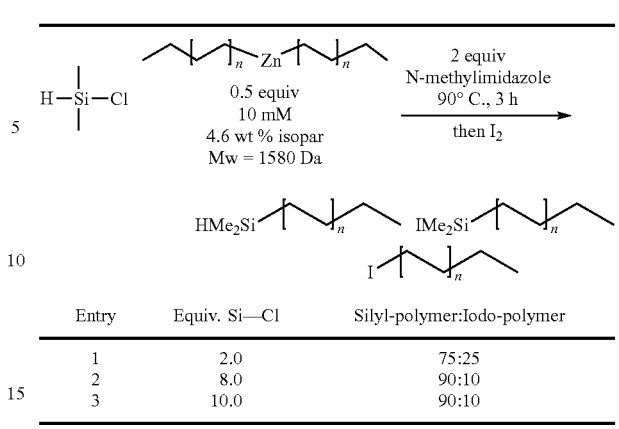

| Entry | Equiv. Si—Cl | Silyl-polymer:Iodo-polymer |
|---|---|---|
| 1 | 2.0 | 75:25 |
| 2 | 8.0 | 90:10 |
| 3 | 10.0 | 90:10 |

Silyl:iodo ratio measured by $^1$H NMR Integrations

Reference Example A showed that when a relatively volatile chlorosilane was used, improved silylation was achievable with extra equivalents of the chlorosilane.

Reference Example B

Procedure for Silylation of Di-Polyethylene-Zinc with Diphenylhydrogenchlorosilane (HPh$_2$SiCl)

Reference Example A was repeated, except that HPh$_2$SiCl was used instead of HMe$_2$SiCl. The results are shown below.

| Entry | Equiv.NMI | Silyl-polymer:Iodo-polymer |
|---|---|---|
| 1 | 2.0 | 80:20 |
| 2 | 0 | <5:95 |
| 3 | 1.0 | 20:80 |
| 4 | 0.1 | 5:95 |

Silyl:iodo ratio measured by $^1$H NMR Integrations

Reference Example B showed that complete silylation of the di-polyethylene-zinc was possible using NMI as an additive.

Reference Example C

Procedure for Silylation of Di-Polyethylene-Zinc with H$_2$PhSiCl

Di-polyethylene-zinc and Isopar (Mw=1580 Da, 10 mM) were placed in a vial. The vial was heated at 120° C. until the contents became clear and homogeneous. Phenyl,dihydrogen,chlorosilane and an additive selected from NMI or blend of NMI with TMEDA were added to the vial. The vial was heated for a period of time. Iodine (I$_2$) was then added to quench unreacted di-polyethylene zinc. The resulting product was evaluated by $^1$H NMR. The molar equivalents of chlorosilane, of additive, the time and temperature for heating, and conversion to product results are shown below.

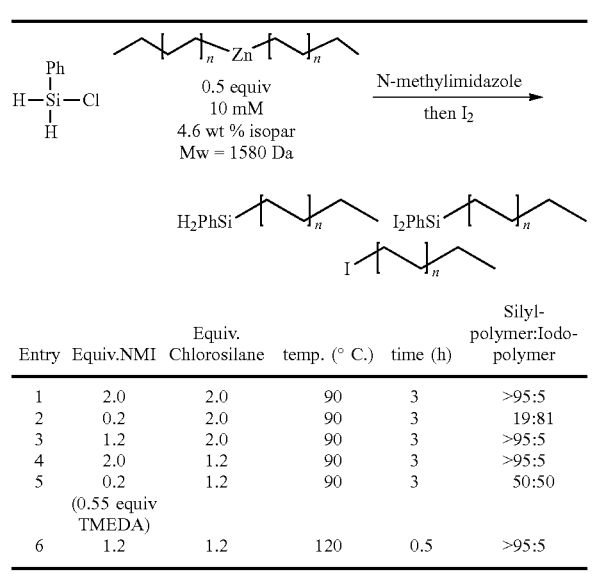

| Entry | Equiv.NMI | Equiv. Chlorosilane | temp. (° C.) | time (h) | Silyl-polymer:Iodo-polymer |
|---|---|---|---|---|---|
| 1 | 2.0 | 2.0 | 90 | 3 | >95:5 |
| 2 | 0.2 | 2.0 | 90 | 3 | 19:81 |
| 3 | 1.2 | 2.0 | 90 | 3 | >95:5 |
| 4 | 2.0 | 1.2 | 90 | 3 | >95:5 |
| 5 | 0.2 (0.55 equiv TMEDA) | 1.2 | 90 | 3 | 50:50 |
| 6 | 1.2 | 1.2 | 120 | 0.5 | >95:5 |

Silyl:iodo ratio measured by $^1$H NMR Integrations

Reference Example C showed that complete silylation with phenyl,dihydrogen,chlorosilane was observed with the conditions described in Entry 6. At least 1 equivalent of NMI was capable of completing the hydrosilylation. A blend of NMI and another amine base was used as the additive for comparative purposes in Entry 5.

Reference Example D

Di-polyethylene-zinc and Isopar (Mw=1080 Da, 10 mM) were placed in a vial. The vial was heated at 120° C. until the contents became clear and homogeneous. Phenyl,dihydrogen,chlorosilane and an additive were added to the vial. The vial was heated at 100° C. for 1 hour. I$_2$ was then added to quench unreacted di-polyethylene zinc. The resulting product was evaluated by $^1$H NMR. The additive and conversion to product results are shown below.

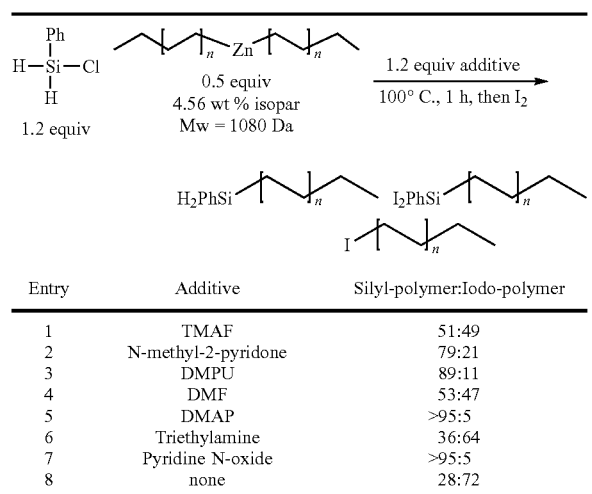

| Entry | Additive | Silyl-polymer:Iodo-polymer |
|---|---|---|
| 1 | TMAF | 51:49 |
| 2 | N-methyl-2-pyridone | 79:21 |
| 3 | DMPU | 89:11 |
| 4 | DMF | 53:47 |
| 5 | DMAP | >95:5 |
| 6 | Triethylamine | 36:64 |
| 7 | Pyridine N-oxide | >95:5 |
| 8 | none | 28:72 |

Silyl:iodo ratio measured by $^1$H NMR Integrations

Reference Example D showed that complete silylation was observed under the conditions tested using 4-dimethylaminopyridine, and pyridine-N-oxide as the additive. The example also showed that N-methyl pyridone and DMPU can also be used as the additive to promote silylation because as shown in Entry 2 and Entry 3, more silyl polymer formed than the comparative control (Entry 8) with no additive.

Reference Example E

Reference Example A was repeated using phenylhydrogendichlorosilane (HPhSiCl2) instead of HMe$_2$SiCl and using 1.2 equivalents of NMI instead of 2 equivalents as the additive. The results are shown below.

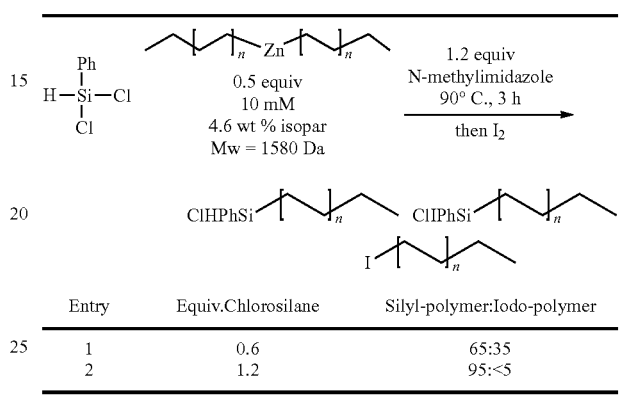

| Entry | Equiv.Chlorosilane | Silyl-polymer:Iodo-polymer |
|---|---|---|
| 1 | 0.6 | 65:35 |
| 2 | 1.2 | 95:<5 |

Silyl:iodo ratio measured by $^1$H NMR Integrations

Reference Example E showed that substitution occurred at only one of the two Si—Cl bonds, even when the amount of HPhSiCl$_2$ was reduced.

Reference Example F

Di-polyethylene-zinc and Isopar (Mw=1205 Da, 10 mM) were placed in a vial. The vial was heated at 120° C. until the contents became clear and homogeneous. Dimethylhydrogeniodosilane (HMe$_2$SiI) and NMI were added to the vial. The vial was heated at 110° C. for 3 hours. I$_2$ was then added to quench unreacted di-polyethylene zinc. The resulting product was evaluated by $^1$H NMR. The molar equivalents of HMe$_2$SiI and conversion to product results are shown below.

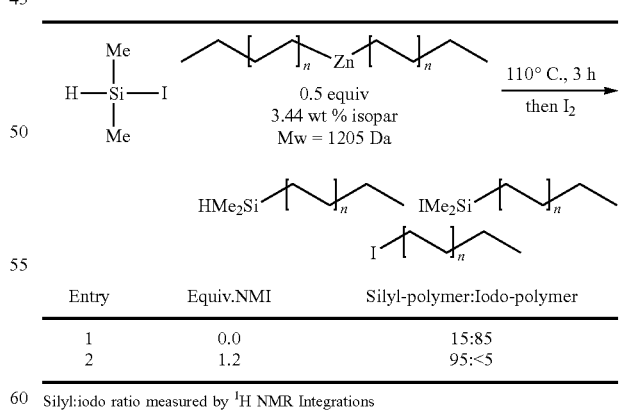

| Entry | Equiv.NMI | Silyl-polymer:Iodo-polymer |
|---|---|---|
| 1 | 0.0 | 15:85 |
| 2 | 1.2 | 95:<5 |

Silyl:iodo ratio measured by $^1$H NMR Integrations

Reference Example F showed that NMI also promoted silylation with halosilanes other than chlorosilanes (e.g., iodosilanes). In the absence of NMI, the iodosilane was not electrophilic enough to undergo complete reaction with the dipolyethylene-zinc under the conditions tested in this example.

Reference Example G

Silylation of an ethylene/octene polymeryl zinc with H$_2$PhSiCl was performed as follows. In a glovebox, a 20 mL vial was charged with the copolymerylzinc (Mn=1940 Da, 30.66% octene, 3.10% polymer in Isopar™ E, 14.95 g, 0.117 mmol, 0.500 equiv). The mixture was stirred and heated to 110° C. until the mixture became clear and homogeneous. NMI (22.5 µL, 0.282 mmol, 1.20 equiv) was added, followed by chlorophenylsilane (37.64, 0.282 mmol, 1.20 equiv). The mixture was stirred for 1 hour. A portion of the solution was removed and quenched with an excess of iodine for conversion analysis. The polymer solution was poured into an excess of methanol, which precipitated polymer. The polymer was isolated by filtration and was dried in a vacuum oven.

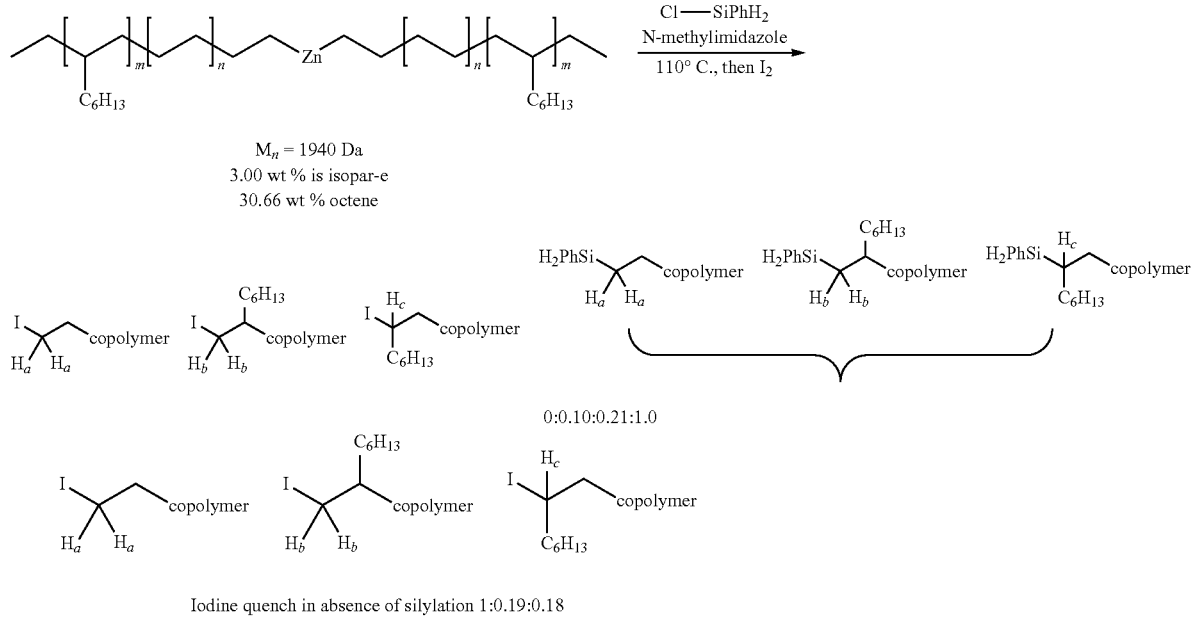

Reference Example G showed that silylation with an ethylene/octene copolymeryl-zinc is possible using NMI.

Reference Example H

General Procedure for Preparation of Silyl Terminated Organo-Metal

Polymerizations were conducted in a 2 L PARR batch reactor. The reactor was heated by an electrical heating mantle and was cooled by an internal serpentine cooling coil containing cooling water. Both the reactor and the heating/cooling system were controlled and monitored by a CAMILE TG process computer. The bottom of the reactor was fitted with a dump valve, which emptied the reactor contents into a stainless steel dump pot. The dump pot was vented to a 30 gallon blow-down tank, with both the pot and the tank purged with nitrogen. All solvents used for polymerization or catalyst makeup were run through solvent purification columns to remove any impurities that may affect polymerization. The 1-octene, Isopar™ E, and toluene were passed through two columns, the first containing A2 alumina, the second containing Q5. The ethylene was passed through 2 columns, the first containing A204 alumina and 4 Å mol sieves, the second containing Q5 reactant. The nitrogen, used for transfers, was passed through a single column containing A204 alumina, 4 Å mol sieves and Q5.

The desired amount of Isopar™ E and/or toluene solvent and/or 1-octene was added via shot tank to the load column, depending on desired reactor load. The load column was filled to the load set points by use of a lab scale to which the load column was mounted. After liquid feed addition, the reactor was heated up to the polymerization temperature set point. If ethylene was used, it was added to the reactor when at reaction temperature to maintain reaction pressure set point. Ethylene addition amounts were monitored by a micro-motion flow meter.

The scavenger, MMAO-3A (which is commercially available from Akzo Nobel), was handled in an inert glove box, drawn into a syringe and pressure transferred into the catalyst shot tank. This was followed by 3 rinses of toluene, 5 mL each, before being injected into the reactor. The chain-shuttling agent was handled in an inert glove box, drawn into a syringe and pressure transferred into the catalyst shot tank. This was followed by 3 rinses of toluene, 5 mL each, before being injected into the reactor. The procatalyst and activators were mixed with the appropriate amount of purified toluene to achieve a desired molarity solution. The catalyst and activators were handled in an inert glove box, drawn into a syringe and pressure transferred into the catalyst shot tank. This was followed by 3 rinses of toluene, 5 mL each. Immediately after catalyst addition, the run timer began. If ethylene was used, it was then added by the CAMILE to maintain reaction pressure set point in the reactor. These polymerizations were either run for 10 minutes, or a targeted ethylene uptake. The agitator was then stopped and the bottom dump valve opened to empty reactor contents into a clean dump pot that had been stored in a 130° C. oven for greater than 60 minutes before use to drive off any excess water absorbed by the metal surface. Once the contents of the reactor were emptied into the dump pot, the normal flow of nitrogen inerting was switched to argon, via a ball valve. The argon flowed for a calculated period of time to allow five exchanges of the volume of gas in the pot. When the argon inerting was complete, the dump pot was lowered from its fixture, and a secondary lid with inlet and outlet valves was sealed to the top of the pot. The pot was then inerted with argon for an additional five exchanges of gas, via a supply line and inlet/outlet valves. When complete, the valves were closed. The pot was then transferred to a glove box without the contents coming into contact with the outside atmosphere.

Reference Example I—Preparation of Sample According to General Procedure of Reference Example H A homopolyethylene sample was prepared following the general procedure in Reference Example H using the following conditions: 120° C., 23 g of initial ethylene loaded, 600 g toluene, 10 μmol MMAO-3A, 1.2 eq. of activator to procatalyst. The amount of procatalyst used was adjusted to reach a desired efficiency. The reactor pressure and temperature was kept constant by feeding ethylene during the polymerization and cooling the reactor as needed. The polymerization was performed with bis(hydrogenated tallow alkyl)methylammonium tetrakis(pentafluorophenyl)borate as the activator, bis(N-isobutyl-6-mesitylpyridin-2-amine) dimethylhafnium as the procatalyst, and bis(8-(dimethylsilyl)octyl)zinc as the chain shuttling agent. $^1$H-NMR Mn: 1586 per chain, GPC Mn: 1310 per chain.

A poly(ethylene/octene) copolymer sample was prepared following the general procedure in Reference Example H using the following conditions: 120° C., 23 g of initial ethylene loaded, 397 g Isopar™ E, 115 g 1-octene, 10 μmol MMAO-3A, 1.2 eq. of activator to procatalyst. The amount of procatalyst used was adjusted to reach a desired efficiency. The reactor pressure and temperature were kept constant by feeding ethylene during the polymerization and cooling the reactor as needed. The polymerization was performed with bis(hydrogenated tallow alkyl)methylammonium tetrakis(pentafluorophenyl)borate as the activator, [N-[2,6-Bis(1-methylethyl)phenyl]-α-[2-(1-methylethyl)phenyl]-6-(1-naphthalenyl-C2)-2-pyridinemethanaminato] dimethylhafnium as the procatalyst, and bis(8-(dimethylsilyl)hexyl)zinc as the chain shuttling agent. GPC Mn: 25,020 per chain, Co-monomer incorporation: 48% 1-octene.

Reference Example J

This Reference Example J shows a water washing method used to purify mono-SiH terminated polyethylene. 0.90 g of mono-SiH polyethylene prepared as described above was diluted to 10% in toluene in a 100 mL round bottom flask containing a magnetic stir bar. The solution was heated by placing the flask in an aluminum block at a temperature of 85° C. The mono-SiH terminated polyethylene dissolved. Deionized water (6 g) was added and mixed for 5 minutes. Stirring was then stopped, and the aqueous phase (on bottom) was removed using a plastic pipette. Excellent separation was achieved. Both phases were clear, and the pH of the wash water was alkaline.

The following process was performed 7 times at 85° C. Deionized water (4 g) was added and mixed for 5 minutes. The aqueous phase was removed. The resulting solution of toluene and mono-SiH terminated polyolefin was poured onto a Teflon™ sheet to dry overnight. The pH of the final water wash was slightly acidic indicating that the imidazole was successfully removed.

The silyl terminated polyolefins prepared as described in the Reference Examples above can be used as starting materials to make polyolefin-polydiorganosiloxane block copolymers, such as polyethylene-polydimethylsiloxane copolymers.

Reference Example 1—Polyethylene-Polydimethylsiloxane Diblock Copolymer

A polyethylene-polydimethylsiloxane block copolymer with (AB)$_n$ architecture was prepared in this Reference Example 1, as follows: 1.44 g (1 molar equiv.) of 63% telechelic Me$_2$HSi-terminated polyethylene (Mn: 1700 Da) was brought into a nitrogen filled glovebox in a 100 mL jar with a stirbar. 3.3361 g (1.234 equiv, stoichiometry previously determined empirically to account for dead chain ends) of bis-silanol terminated polydimethylsiloxane having Mn of 4860 as measured by NMR (commercially available from Gelest, Inc. of Morrisville, Pa., U.S.A.: DMS-S21) was weighed directly into the vial inside the glovebox. 7.3 mL of toluene was added and the jar was heated to 103° C. in order to melt the polyethylene, and the jar was stirred gently to avoid splashing on the sidewalls. 350 μL of a 20 mg/mL toluene solution of tris(pentafluorophenyl)borane was added and immediate bubbling was observed. The cap was placed loosely on the jar to allow H$_2$ gas to evolve and the jar was heated at 100° C. overnight.

After running overnight, the reaction was cooled to room temperature and hardened. Isopropanol was added to the jar and the resulting copolymer was broken up with a spatula. The mixture was stirred vigorously to break up the pieces. Stirring was ceased and the copolymer was collected in a plastic disposable frit, then dried in a vacuum oven at 40° C. 4.50 g of material was collected. $^1$H-NMR indicated the complete consumption of the Si—H functionality. High temperature GPC in trichlorobenzene indicated approximately 6.5 repeating units of (polyethylene-polydimethylsiloxane).

A polyethylene-polydimethylsiloxane triblock copolymer with ABA architecture was prepared in this Reference Example 2, as follows:

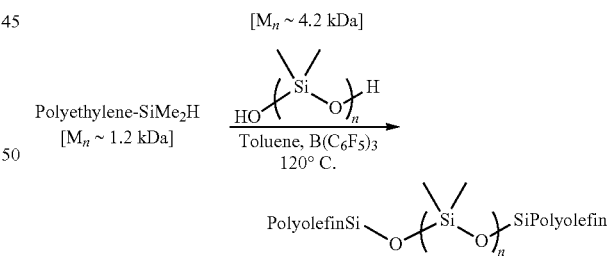

In a glove box: 150 mg of Polyethylene-SiMe$_2$H (mono terminated), 1.2 kDa, and 261 mg of telechelic hydroxyl-terminated PDMS (commercially available from Gelest as DMS-S21 oil, 1 molar equiv Si—OH) were heated to 120° C. Subsequently, 6 μL of a 100 mg/mL solution of tris (pentafluorophenyl)borane (0.01 molar equiv.) in toluene was added at which point the evolution of hydrogen was observed. The solution was stirred for 20 min then removed from the glovebox and precipitated into isopropanol (iPrOH) and dried under high vacuum at 60° C. overnight to yield 415 mg of white waxy solid. The $^1$H NMR spectrum was consistent with the formation of the triblock copolymer.

A polyethylene-polydimethylsiloxane triblock copolymer with ABA architecture was prepared in this Reference Example 3, as follows:

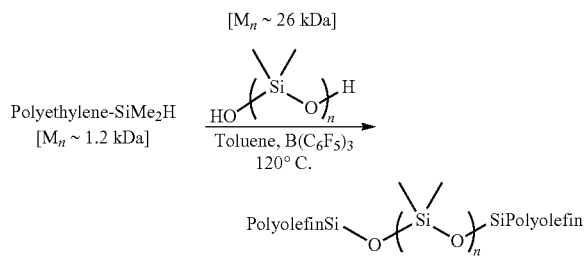

In a glove box: 150 mg of Polyethylene-SiMe$_2$H (mono terminated), 1.2 kDa, and 1.62 g of telechelic hydroxyl terminated PDMS (1 molar equiv Si—OH, DMS-S31) were heated to 120° C. Subsequently, 64 of a 100 mg/mL solution of tris(pentafluorophenyl)borane (0.01 molar equiv) in toluene was added. The solution was stirred for 20 min then removed from the glovebox and precipitated into iPrOH and dried under high vacuum at 60° C. overnight to yield 1.65 g of white waxy solid. The $^1$H NMR spectrum was consistent with the formation of the triblock copolymer, with no apparent residual SiH functionality as indicated by the disappearance of the SiH resonance at 4.04 ppm.

Reference Example 4—GPC Test Method

The samples of copolymer and silyl terminated polyolefin prepared as described above in the Reference Examples were analyzed on a PolymerChar GPC-IR maintained at 160° C. Each sample was eluted through 1×PLgel 20 μm 50×7.5 mm guard column and 4×PLgel 20 μm Mixed A LS 300×7.5 mm columns with 1,2,4-trichlorobenzene (TCB) stabilized by 300 ppm of butylated hydroxyl toluene (BHT) at a flowrate of 1 mL/min. The 16 mg of copolymer sample was weighed out and diluted with 8 mL of TCB by the instrument. For molecular weight, a conventional calibration of polystyrene (PS) standards (Agilent PS-1 and PS-2) was used with apparent units adjusted to homo-polyethylene (PE) using known Mark-Houwink coefficients for PS and PE in TCB at this temperature. Decane was used as an internal flow marker and retention time was adjusted to this peak. For the comonomer incorporation, copolymers of known composition were used to develop a calibration curve for incorporation.

In this example 5, to an oven-dried 1 L round bottom flask and stir bar was added 55.28 g (18.96 mmol, 2.25 equiv.) of an SiH-terminated poly(ethylene-co-octene) (M$_n$ 2672 g/mol, effective M$_n$ by SiH 2916 g/mol, 2.70 mol % octene by $^{13}$C-NMR). The flask was brought into a glovebox. Then, in a 150 mL jar was weighed out 57.4 g (8.43 mmol, 1 equiv.) of a 50 wt % solution of bis-silanol terminated PDMS (M$_n$ 3130 g/mol by GPC) in toluene, dried over molecular sieves. The solution was poured into the round bottom flask and washed out with several rinses of toluene to total approximately 350 mL of toluene. A Stevens condenser was affixed to the flask and the flask was heated to 100° C. A solution of tris(pentafluorophenyl)borane (52.5 mg, 0.09 mmol, 0.5 mol %) in 3 mL of toluene) was prepared. After heating at 100° C. for 1.5 h, the flask contained a slightly hazy solution, but no chunks of polymer remained. Then, 0.5 mL of catalyst solution was added, upon which many bubbles formed. After a minute, the bubble formation slowed and a further 2 mL was added in three portions. A small amount of bubbling continued. After 1.5 hours, an aliquot was removed, dried down under a flow of nitrogen on a hot plate set at 125° C., dissolved in tetrachloroethane, and analyzed by NMR. NMR indicated the complete absence of SiH.

The material was removed from the glovebox and poured into a tared steel pan. Polymer that remained on the inside of the flask was washed out into the pan. The pan was covered with aluminum foil and placed in a fume hood to dry overnight.

Then the pan was moved into a vacuum oven set at 55° C. over the weekend. 83.10 g of material was isolated as a white solid. Conventional GPC appeared to show some remaining PDMS, so the material was redissolved in ~350 mL of toluene at 100° C. and then cooled to room temperature. The slush was then added into a stirring solution of isopropanol (1 L) and precipitated. The mixture formed a milky solution. In order to isolate the polymer, the mixture was poured into a 1 L container and centrifuged at 3000 rpm for 30 minutes. This process was completed in three batches. The supernatant was decanted through a disposable plastic frit. The compacted polymer was then poured out into the frit and dried. Residual polymer was washed out from the centrifuge container with small volumes of isopropanol and air was pulled through the filter cake for at least an hour, or, until the majority of the liquid was collected. Then, the plastic frit was covered and placed in a vacuum oven overnight at 55° C. High temperature liquid chromatography of the final material showed that the mixture contained 0.9 wt % free PDMS. The resulting composition showed 63.1% polyolefin in the triblock copolymer.

Industrial Applicability

Polyolefin-polydiorganosiloxane block copolymers were found to provide performance benefits to polyorganosiloxane hot melt adhesive compositions as compared to a comparative hot melt adhesive composition containing a polyolefin homopolymer instead of the Polyolefin-polydiorganosiloxane block copolymer. Without wishing to be bound by theory, it is thought that grafting a polyolefin to a polydiorganosiloxane polymeric block enables the resulting copolymer to have superior dispersion into a polydiorganosiloxane hot melt adhesive composition comprising a polyorganosilicate resin and a polydiorganosiloxane polymer, thereby enhancing desired performance target of increasing stiffness/modulus. Crystallization of the dispersed polyolefin phase is thought to provide reinforcement akin to how a sub-micron dispersed particle or phase reinforces composites.

It is thought that adding a polyolefin-polydiorganosiloxane block copolymer in an amount sufficient to provide relatively low amounts of the polyolefin, such as polyethylene, (e.g., up to and including 5%) to a polyorganosiloxane hot melt adhesive composition can increase the viscosity or modulus upon cooling from the hot-melt dispensing temperature by over an order of magnitude (as compared to the same polyorganosiloxane hot melt adhesive composition not containing the copolymer) within a relatively narrow 5° C. window as a consequence of crystallization of the polyethylene phase. This is a significant improvement over conventional polyorganosiloxane hot melt adhesive compositions, which exhibit much more gradual viscosity or modulus increases with decreasing temperature.

Definitions and Usage of Terms

All amounts, ratios, and percentages are by weight unless otherwise indicated by the context of the specification. The amounts of all starting materials in a composition total 100% by weight. The Brief Summary of the Invention and the Abstract are hereby incorporated by reference. The articles 'a', 'an', and 'the' each refer to one or more, unless otherwise indicated by the context of specification. The disclosure of ranges includes the range itself and also anything subsumed therein, as well as endpoints. For example, disclosure of a range of 1 to 20 includes not only the range of 1 to 20 including endpoints, but also 1, 2, 3, 4, 6, 10, and 20 individually, as well as any other number subsumed in the range. Furthermore, disclosure of a range of, for example, 1 to 20 includes the subsets of, for example, 1 to 3, 2 to 6, 10 to 20, and 2 to 10, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup hydrogen, alkyl and aryl; the subgroup hydrogen and alkyl; and any other individual member and subgroup subsumed therein.

"Periodic Table of the Elements" refers to the Periodic Table of the Elements published in the CRC Handbook of Chemistry and Physics, 68th Edition, by CRC Press, Inc., 1987. Any reference to a Group or Groups means the Group or Groups reflected in this Periodic Table of the Elements using the IUPAC system for numbering groups.

The term "creep" refers to shear strain under static load (constant stress). Creep resistance (wherein a hot melt adhesive according to the invention exhibits minimal creep, or less creep than a conventional polyorganosiloxane composition that does not contain a polyolefin-polyorganosiloxane block copolymer is a desirable property.

The term "comprise" and derivatives thereof (e.g., comprising, comprises) means including and is not intended to exclude the presence of any additional component, starting material, step or procedure, whether or not the same is expressly recited herein.

The term "green strength" refers to the solidification and modulus increase upon cooling a reactive hot melt adhesive composition from a dispensing temperature to a lower temperature before the hot melt adhesive achieves full cure. It is desirable for a hot melt adhesive prepared as described herein to have high green strength quickly and after cooling by a small amount, e.g., solidification after cooling by 5° C.

The term "hydrocarbyl" means groups containing only hydrogen and carbon atoms, including branched or unbranched, saturated or unsaturated, cyclic or noncyclic groups. Monovalent hydrocarbyl groups include alkyl including cycloalkyl, alkenyl, alkadienyl, cycloalkenyl, cycloalkadienyl, aryl, and alkynyl groups.

The term "colorant" includes any starting material used to impart color to a hot melt adhesive prepared from a hot melt adhesive composition described herein.

The term "telechelic" refers to a reactive polymer and means that the reactive polymer possesses reactive functional groups at the chain ends, where the polymer chain ends may have either the same or different reactive functional groups. As used herein, either one, both, or neither of (A) the silyl terminated polyolefin and (B) the polydiorganosiloxane may be telechelic.

The following abbreviations are used throughout the specification.

TABLE X

| Abbreviation | Definition |
|---|---|
| | Abbreviations. |
| BCP | Block copolymer |
| ° C. | Degrees Celsius |
| Da | Daltons or g/mol |
| DMAP | 4-(dimethylamino) pyridine |
| DMF | N,N-dimethylformamide |
| DMPU | 1,3-dimethyl-3,4,5,6-tetrahydro-2-pyrimidinone |

TABLE X-continued

| Abbreviation | Definition |
|---|---|
| | Abbreviations. |
| DP | degree of polymerization |
| Et | ethyl |
| FTIR | Fourier-transform infrared spectroscopy |
| FW | formula weight |
| g | gram |
| GPC | gel permeation chromatography or size exclusion chromatography |
| HMA | Hot melt adhesive |
| hr | hour |
| IR | infra-red |
| L | liter |
| Me | methyl |
| mg | milligram |
| mL | Milliliter |
| mmol | millimole |
| Mn | number-average molecular weight (Da) determined by GPC |
| mol | mole |
| Mw | Weight-average molecular weight (Da) determined by GPC |
| NMI | N-methyl imidazole |
| NMR | Nuclear magnetic resonance spectroscopy |
| NVC | Non-volatile content |
| PD | polydispersity-based on the ratio of Mw to Mn |
| PDMS | polydimethylsiloxane |
| PE | polyethylene |
| Ph | phenyl |
| ppm | parts per million by weight |
| RT | Room temperature of 20° C. to 25° C. |
| THF | Tetrahydrofuran |
| TMAF | Tetramethylammonium fluoride |
| TMEDA | Tetramethylenediamine |
| μ | micro |
| Vi | Vinyl |

EMBODIMENTS OF THE INVENTION

In a first embodiment, the hot melt adhesive composition may be non-reactive, and the hot melt adhesive will form by cooling the hot melt adhesive composition from the melt dispensing temperature to a lower temperature. In this embodiment, the starting materials comprise (A), (B), and (C) as described above, and the substituents (R groups) on the starting materials described above are not reactive with one another, and (D) the catalyst, (E) the crosslinker, and (F) the inhibitor are typically not added to the non-reactive hot melt adhesive composition.

In a second embodiment, the hot melt adhesive composition is reactive and comprises starting materials (A), (B), (C), and (D). The reactive hot melt adhesive composition hardens by both cooling and curing. When the hot melt adhesive composition is reactive, it may further comprise starting material (E) the crosslinker. When the hot melt adhesive composition is hydrosilylation reaction curable, starting material (D) comprises a hydrosilylation reaction catalyst described above. In the hydrosilylation reaction curable hot melt adhesive composition, one or more of starting materials (A), (B), and (C) has terminally aliphatically unsaturated hydrocarbyl groups capable of undergoing hydrosilylation reaction in this embodiment. In this embodiment, (E) the crosslinker may have silicon bonded hydrogen atoms. In this embodiment (F) the inhibitor can be added to control the cure rate of the hydrosilylation reaction curable hot melt adhesive composition.

When the hot melt adhesive composition is a condensation reaction curable hot melt adhesive composition, starting material (D) comprises a condensation reaction catalyst. In this embodiment, one or more of starting materials (A), (B), and (C) has silicon bonded hydrolyzable substituents. In this embodiment, the condensation reaction curable hot melt adhesive composition may further comprise (H) the moisture scavenger.

Alternatively, the hot melt adhesive composition may be a dual cure composition, e.g., containing both a hydrosilylation reaction catalyst and a condensation reaction catalyst.

In a third embodiment of this invention, the hot melt adhesive composition comprises: (A) a polyolefin-polydiorganosiloxane block copolymer, where the polyolefin-polydiorganosiloxane block copolymer comprises unit formula (I):

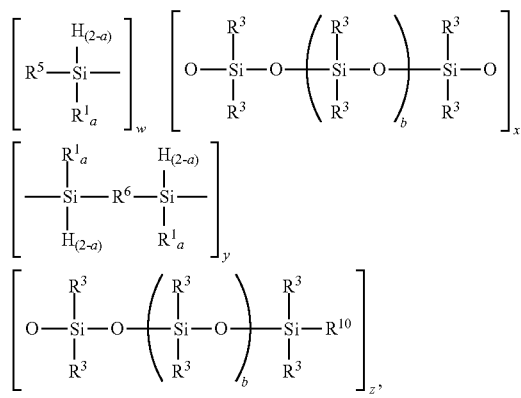

where each $R^1$ is an independently selected monovalent hydrocarbyl group, each $R^3$ is independently selected from a hydrogen atom and a monovalent organic group free of hydrolyzable functionality, each $R^5$ is an independently selected hydrogen terminated polyolefin, each $R^6$ is an independently selected divalent polyolefin, each $R^{10}$ is independently selected from $R^3$ and an alkoxysilyl functional hydrocarbylene containing group each subscript a is independently 1 or 2, each subscript b is independently 0 or a positive number; subscript w is 0 to 2, subscript x is 0 or a positive number, subscript y is 0 or a positive number, subscript z is 0 to 2, a quantity (w+y) 1, a quantity (x+z)≥1, with the proviso that when subscript w is 0, subscript x is >0 and when subscript z=0, subscript w>0;

(B) a polydiorganosiloxane; and (C) a polyorganosilicate resin.

In a fourth embodiment, the copolymer of the third embodiment is selected from the group consisting of formula (IV):

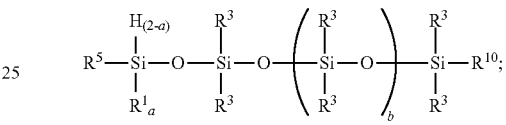

formula (V):

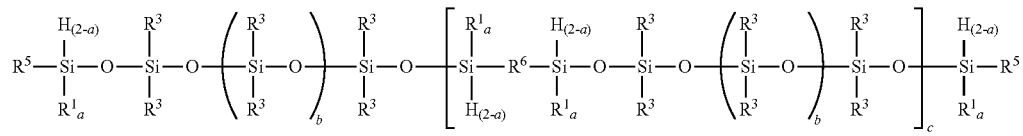

where subscript c≥0;
formula (VI):

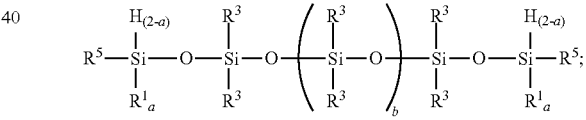

formula (VII):

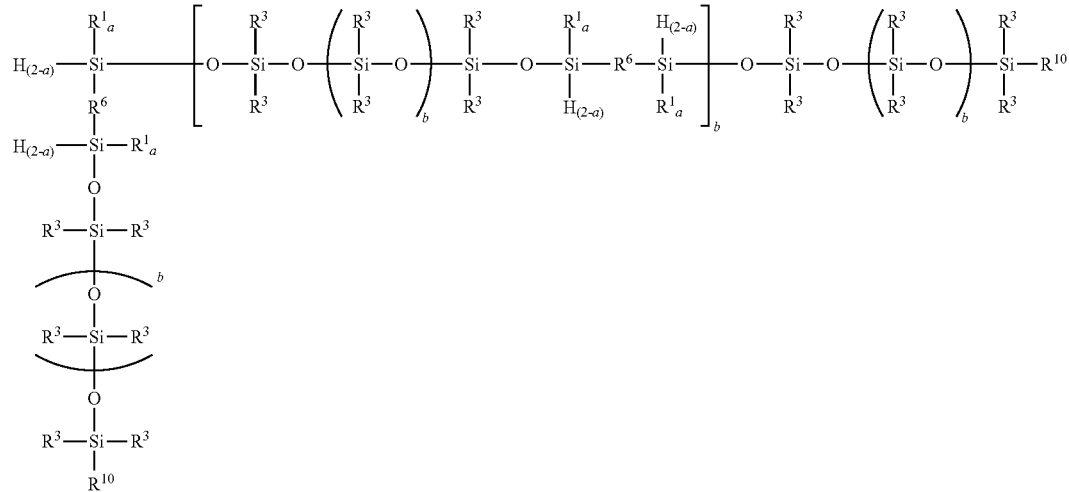

where subscript d≥0;
formula (VIII):

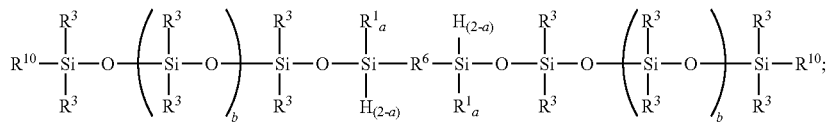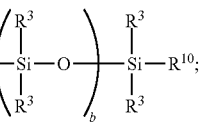

or a combination of two or more of formulae (IV), (V), (VI), and (VIII);

where each $R^1$ is an independently selected monovalent hydrocarbyl group, each $R^3$ is independently selected from a hydrogen atom and a monovalent organic group free of hydrolyzable functionality, each $R^5$ is an independently selected hydrogen terminated polyolefinic block, each $R^6$ is an independently selected divalent polyolefinic block, each $R^{10}$ is independently selected from $R^3$ and an alkoxysilyl functional hydrocarbylene containing group, each subscript a is independently 1 or 2, and each subscript b≥0.

In a fifth embodiment, the copolymer of the fourth embodiment has at least one instance of $R^{10}$ representing an alkoxysilyl functional hydrocarbylene containing group with a formula selected from:

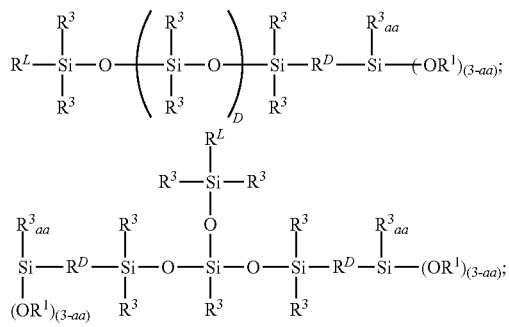

one or both of

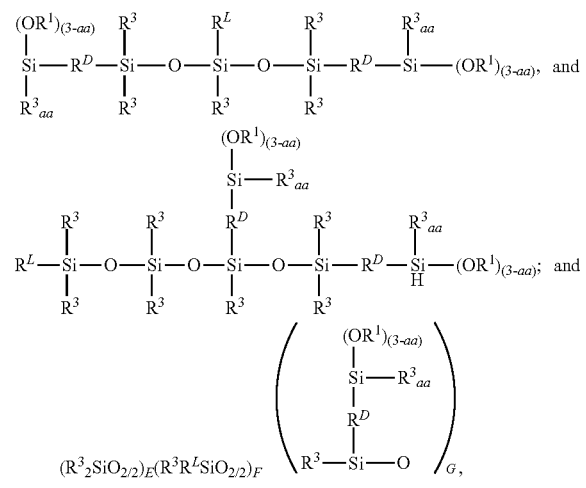

where each $R^L$ is an oxygen atom, each $R^D$ is independently a divalent hydrocarbyl group of 2 to 18 carbon atoms; each subscript aa is independently 0, 1, or 2, alternatively 0 or 1; subscript D is 0 to 20, alternatively 1 to 10; E is 0 or more, subscript F is 1 or more, and subscript G is 1 or more and 4≤(E+F+G)≤50

In a sixth embodiment, in any one of the third, fourth or fifth embodiments, one or more of conditions (i) and (ii) is met, where
Condition (i) is that each $R^5$ has unit formula $H[(CH_2CH_2)_t(CHR^7CH_2)_u]_g$, and
Condition (ii) is that each $R^6$ has unit formula $[(CH_2CH_2)_t(CHR^7CH_2)_u]_g$; where subscripts t and u have relative values such that 0<t≤1, 0≤u≤1, subscript g 1, and each $R^7$ is an independently selected monovalent hydrocarbyl group of 2 to 20 carbon atoms.

In a seventh embodiment, in any one of the third, fourth, fifth or sixth embodiments the polyolefin-polydiorganosiloxane block copolymer is capable of reacting with (B) the reactive polydiorganosiloxane, (C) the polyorganosilicate resin, or both (B) and (C).

In an eighth embodiment, in the seventh embodiment, the hot melt adhesive composition further comprises an additional starting material selected from the group consisting of (D) a catalyst, (E) a crosslinker, (F) an inhibitor, (G) a vehicle, (H) a moisture scavenger, (I) a filler, (J) a colorant, (K) a fluorescent brightener, (L) a corrosion inhibitor, (M) a thermal stabilizer, and combinations of two or more of (E), (F), (G), (H), (I), (J), (K), (L), and (M).

In a ninth embodiment, in the composition of any one of the third through seventh embodiments, the polydiorganosiloxane has terminal hydroxyl groups (i.e., silanol terminated).

In a tenth embodiment, in the ninth embodiment, the polydiorganosiloxane is a polydimethylsiloxane.

In an eleventh embodiment, in the ninth or tenth embodiment, the polyorganosilicate resin has methyl groups.

In a twelfth embodiment, in the composition of any one of the preceding embodiments at least one of starting material (B) the polydiorganosiloxane and starting material (C) the polyorganosilicate resin comprises at least one instance a silicon bonded alkoxysilyl functional hydrocarbylene containing group with a formula selected from:

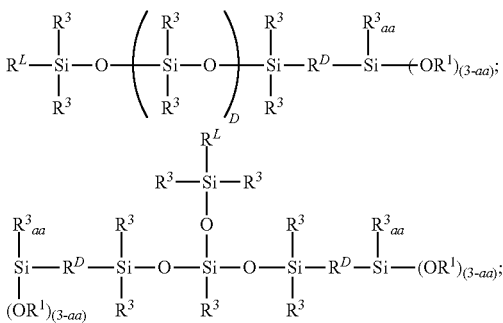

one or both of

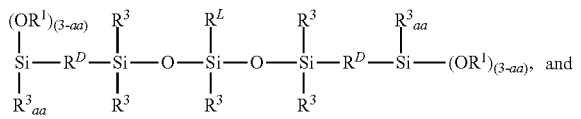

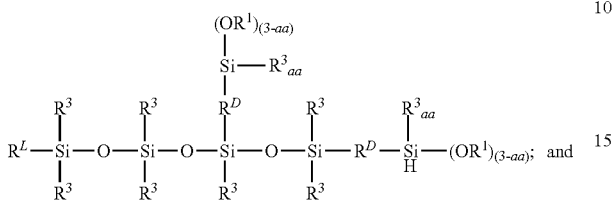

and

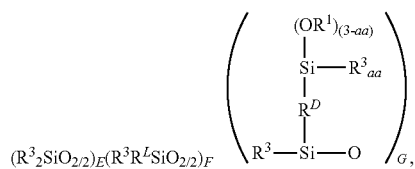

where each $R^L$ is an oxygen atom, each $R^D$ is independently a divalent hydrocarbyl group of 2 to 18 carbon atoms; each subscript aa is independently 0, 1, or 2, alternatively 0 or 1; subscript D is 0 to 20, alternatively 1 to 10; E is 0 or more, subscript F is 1 or more, and subscript G is 1 or more and $4 \leq (E+F+G) \leq 50$.

The invention claimed is:

1. A hot melt adhesive composition comprising:
(A) a polyolefin-polydiorganosiloxane block copolymer, where the polyolefin
polydiorganosiloxane block copolymer comprises unit formula (I):

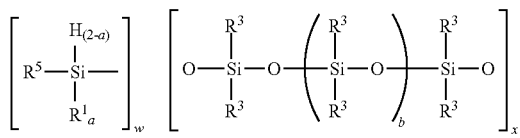

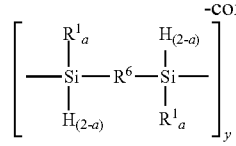

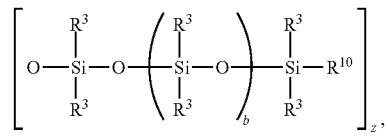

where each $R^1$ is an independently selected monovalent hydrocarbyl group, each $R^3$ is independently selected from a hydrogen atom and a monovalent organic group free of hydrolyzable functionality, each $R^5$ is an independently selected hydrogen terminated polyolefin, each $R^6$ is an independently selected divalent polyolefin, each $R^{10}$ is independently selected from $R^3$ and an alkoxysilyl functional hydrocarbylene containing group each subscript a is independently 1 or 2, each subscript b is independently 0 or a positive number; subscript w is 0 to 2, subscript x is 0 or a positive number, subscript y is 0 or a positive number, subscript z is 0 to 2, a quantity (w+y) 1, a quantity (x+z)≥1, with the proviso that when subscript w is 0, subscript z is >0 and when subscript z=0, subscript w>0;
(B) a reactive polydiorganosiloxane; and
(C) a polyorganosilicate resin.

2. The hot melt adhesive composition of claim 1, where in unit formula (I) subscript w=1, subscript x=0, subscript y=0, and subscript z=1, and (A) the copolymer has formula (IV):

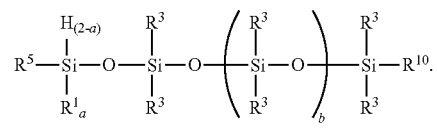

3. The composition of claim 1, where in unit formula (I) subscript w=2, subscript z=0, subscript x≥1, subscript y≥0, and the copolymer has formula (V):

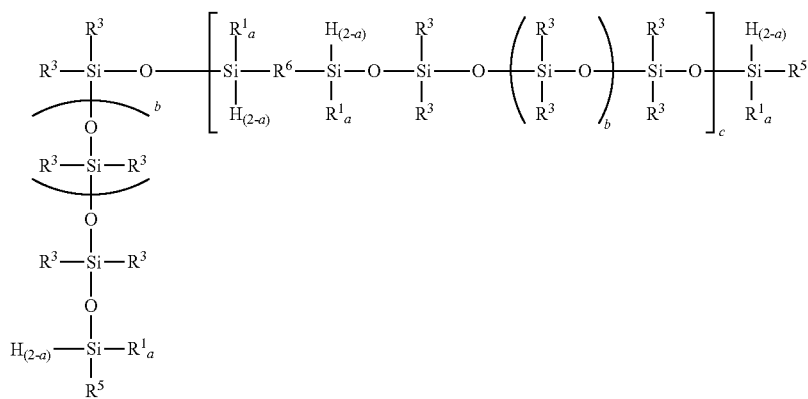

where subscript c 0.

4. The composition of claim 1, where in unit formula (I), subscript z=2, subscript w=0, subscript x≥0, and subscript y≥1, and the copolymer has formula (VII):

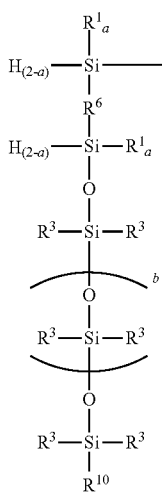
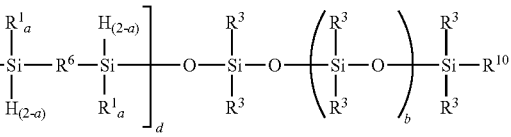

where subscript d 0.

5. The composition of claim 1, where
(i) each $R^5$ has unit formula $H[(CH_2CH_2)_t(CHR^7CH_2)_u]_g$,
(ii) each $R^6$ has unit formula $[(CH_2CH_2)_t(CHR^7CH_2)_u]_g$; or
(iii) both (i) and (ii), where subscripts t and u have relative values such that 0<t≤1, 0≤u≤1, subscript g≥1, and each $R^7$ is an independently selected monovalent hydrocarbyl group of 2 to 20 carbon atoms.

6. The composition of claim 1, where the polyolefin-polydiorganosiloxane block copolymer is capable of reacting with (B) the reactive polydiorganosiloxane, (C) the polyorganosilicate resin, or both (B) and (C).

7. The composition of claim 1, further comprising an additional starting material selected from the group consisting of (D) a catalyst, (E) a crosslinker, (F) an inhibitor, (G) a vehicle, (H) a moisture scavenger, (I) a filler, (J) a colorant, (K) a fluorescent brightener, (L) a corrosion inhibitor, (M) a thermal stabilizer, and combinations of two or more of (E), (F), (G), (H), (I), (J), (K), (L), and (M).

8. The composition of claim 7, where one or both of Condition (I) and Condition (II) is met, where
Condition (I) is that (E) the crosslinker is present and all or a portion of starting material (A) is capable of reacting with (E) the crosslinker; and
Condition (II) is that (D) the catalyst is present, and at least two of starting materials (A), (B), and (C) are reactive.

9. The composition of claim 7, where at least one of starting material (B) and starting material (C) comprises a silicon bonded hydrogen atom or a terminally aliphatically unsaturated monovalent organic group, and starting material (D) is present and comprises a hydrosilylation reaction catalyst, with the provisos that
when all of starting materials (A), (B) and (C) are free of silicon bonded hydrogen atoms, then the composition further comprises as crosslinker (E), an SiH functional polydiorganosiloxane having two or more silicon bonded hydrogen atoms per molecule; and
when all of starting materials (A), (B) and (C) are free of terminally aliphatically unsaturated monovalent organic groups, then the composition further comprises as crosslinker (E), a polydiorganosiloxane having two or more terminally aliphatically unsaturated monovalent organic groups per molecule.

10. The composition of claim 9, where starting material (B) is a polydiorganosiloxane comprising unit formula: $(R^M{}_{aa}R^{M1}{}_{(3-aa)}Si-O_{1/2})_2(R^M{}_2SiO_{2/2})_{bb}$, where each $R^M$ is an independently selected a monovalent hydrocarbyl group free of aliphatic unsaturation, each $R^{M1}$ is a monovalent hydrocarbyl group having terminal aliphatic unsaturation, subscript aa is 0, 1, or 2, and subscript bb >1.

11. The composition claim 9, where starting material (C) is a polyorganosilicate resin comprising unit formula $(R^{M2}SiO_{1/2})_{cc}(SiO_{4/2})_{dd}$, where each $R^{M2}$ is an independently selected monovalent hydrocarbyl group, subscript cc>0 and subscript dd>0.

12. The composition of claim 7, where starting material (B) comprises a hydrolyzable substituent, starting material (C) comprises a hydrolyzable substituent, and starting material (D) is present and comprises a condensation reaction catalyst capable of catalyzing reaction of the hydrolyzable substituent of starting material (B) and the hydrolyzable substituent of starting material (C).

13. The composition of claim 12, where the hydrolyzable substituent on starting material (B) is selected from the group consisting of a silicon bonded hydrogen atom, a hydroxyl group, and a hydrocarbyloxy group; the hydrolyzable substituent on starting material (C) is selected from the group consisting of a silicon bonded hydrogen atom, a hydroxyl group, and a hydrocarbyloxy group, with the proviso that at least one of starting materials (A), (B), and (C) has, as hydrolyzable substituent, a hydroxyl group or a hydrocarbyloxy group or both.

14. The composition of claim 12, where starting material (B) is a polydiorganosiloxane comprising unit formula: $(R^{M3}{}_{ee}X_{(3-ee)}Si-R^{D1}{}_{1/2})_2(R^{M3}{}_2SiO_{2/2})_{ff}$, where each $R^{M3}$ is an independently selected a monovalent hydrocarbyl group, each X is an independently selected hydrolyzable substituent, each $R^{D1}$ is independently selected from an oxygen atom and a divalent hydrocarbyl group, subscript ee is 0 or 1, and subscript ff≥1.

15. The composition of claim 12, where starting material (C) is a polyorganosilicate resin comprising unit formula $(R^{M4}SiO_{1/2})_{gg}(SiO_{4/2})_{hh}$, where each $R^{M4}$ is independently selected from the group consisting of a monovalent hydrocarbyl group and a hydrolyzable substituent, subscript $gg>0$ and subscript $hh>0$.

16. The composition of claim 1, where starting material (A) is present in an amount of at least 0.1 weight % based on combined weights of all starting materials in the composition.

* * * * *